US010445382B2

(12) United States Patent
Hyatt et al.

(10) Patent No.: US 10,445,382 B2
(45) Date of Patent: Oct. 15, 2019

(54) METHOD AND SYSTEM FOR RELATIONSHIP MANAGEMENT AND INTELLIGENT AGENT

(71) Applicant: Thomson Reuters Global Resources, Baar (CH)

(72) Inventors: Geoffrey Hyatt, Boston, MA (US); Wilbur Swan, Lexington, MA (US); Shawn Samuel, Lincoln, MA (US)

(73) Assignee: Thomson Reuters Global Resources Unlimited Company, Zug (CH)

( * ) Notice: Subject to any disclaimer, the term of this patent is extended or adjusted under 35 U.S.C. 154(b) by 514 days.

(21) Appl. No.: 14/789,857

(22) Filed: Jul. 1, 2015

(65) Prior Publication Data

US 2016/0034588 A1 Feb. 4, 2016

Related U.S. Application Data

(63) Continuation of application No. 13/158,408, filed on Jun. 11, 2011, now abandoned, which is a (Continued)

(51) Int. Cl.
*G06F 16/9535* (2019.01)
*G06F 16/242* (2019.01)
(Continued)

(52) U.S. Cl.
CPC ........ *G06F 16/9535* (2019.01); *G06F 16/242* (2019.01); *G06F 16/24575* (2019.01);
(Continued)

(58) Field of Classification Search
CPC combination set(s) only.
See application file for complete search history.

(56) References Cited

U.S. PATENT DOCUMENTS 5,754,938 A * 5/1998 Herz .................... G06Q 20/383
 348/E7.056
6,460,036 B1 * 10/2002 Herz ................. G06F 17/30867
 348/E7.056

(Continued)

*Primary Examiner* — Shyue Jiunn Hwa
(74) *Attorney, Agent, or Firm* — Duncan Galloway Egan Greenwald, PLLC; Kevin T. Duncan

(57) ABSTRACT

The present invention provides computer-based systems and methods directed to maintaining a database of user profiles based, respectively, on user interaction with third-party systems. The invention includes the processes of: accessing a unique user profile associated with a unique user; automatically collecting, by an agent module executing on a processor associated with a first system, data associated with the unique user based at least in part on the unique user's interaction with a system unassociated with the first system; evaluating by the processor the collected data and searching available databases to identify potential items of interest to the unique user based at least in part on the unique user profile and the collected data; determining a set of predicted items of interest to the unique user from the identified potential items of interest; and presenting at a display associated with the unique user data representing the set of predicted items of interest. In one implementation, the invention provides an intelligent agent possessing a level of "awareness" concerning individual users associated with user profiles or accounts and is adapted to access private and public databases, websites, resources, and other systems to efficiently collect, filter and deliver/present content and resources of interest to the individual user in a predictive fashion.

18 Claims, 25 Drawing Sheets

Related U.S. Application Data continuation of application No. 12/914,742, filed on Oct. 28, 2010, now Pat. No. 8,612,492, which is a continuation of application No. 10/938,406, filed on Sep. 10, 2004, now Pat. No. 7,849,103.

(60) Provisional application No. 60/502,107, filed on Sep. 10, 2003.

(51) Int. Cl.
| | | |
|---|---|---|
| *G06F 16/2457* | (2019.01) | |
| *G06F 21/62* | (2013.01) | |
| *G06F 16/335* | (2019.01) | |
| *G06F 16/28* | (2019.01) | |
| *G06Q 30/02* | (2012.01) | |
| *G06Q 10/10* | (2012.01) | |

(52) U.S. Cl.
CPC .......... *G06F 16/288* (2019.01); *G06F 16/335* (2019.01); *G06F 16/337* (2019.01); *G06F 21/6227* (2013.01); *G06F 21/6254* (2013.01); *G06Q 30/0269* (2013.01); *G06Q 10/107* (2013.01)

(56) References Cited

U.S. PATENT DOCUMENTS

| | | | |
|---|---|---|---|
| 6,868,525 B1* | 3/2005 | Szabo | G06F 17/30067 705/14.53 |
| 7,630,986 B1* | 12/2009 | Herz | G06Q 10/10 |
| 2004/0073482 A1* | 4/2004 | Wiggins | G06Q 30/02 705/14.5 |

\* cited by examiner

METHOD AND SYSTEM FOR RELATIONSHIP MANAGEMENT AND INTELLIGENT AGENT

CROSS-REFERENCE TO RELATED APPLICATIONS

The present application claims benefit of priority as a continuation of U.S. application Ser. No. 13/158,408, filed Jun. 11, 2011, entitled "METHOD AND SYSTEM FOR RELATIONSHIP MANAGEMENT AND INTELLIGENT AGENT", which claims benefit of priority as a continuation to U.S. application Ser. No. 12/914,742, filed Oct. 28, 2010, entitled "Relationship Collaboration System," issued Dec. 17, 2013, as U.S. Pat. No. 8,612,492, which claims benefit of priority as a continuation of U.S. application Ser. No. 10/938,406, filed Sep. 10, 2004, entitled "Relationship Collaboration System," issued Dec. 7, 2010 as U.S. Pat. No. 7,849,103, which claims priority under 35 U.S.C. § 119(e) to U.S. Provisional Application Ser. No. 60/502,107, entitled "Relationship Collaboration System," filed on Sep. 10, 2003, all of which applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2011, Thomson Reuters Global Resources.

FIELD OF THE INVENTION

The field of the invention relates generally to information science and more particularly to relationship management and systems and methods for cultivating relationships and delivering content and enhanced tools to advance business and personal pursuits through leveraging relationship data.

BACKGROUND OF THE INVENTION

With the advents of the printing press, typeset, typewriting machines, and computer-implemented word processing and storage, the amount of information generated by mankind has risen dramatically and with an ever quickening pace. As a result there is a continuing and growing need to collect and store, identify, track, classify and catalogue for retrieval and distribution this growing sea of information, which has spawned an interdisciplinary science called "information science." Information Science is a broad area with a wide-range of participants and is associated with computer science and information management. It is concerned with the structure, representation, management, storage, retrieval and transfer of information and with the human experience in relating with such pursuits. There is a recognized relationship between the science and technology of Information Science ("IS") that covers technical issues such as information/data flow, database systems and data security, user interfaces, information quality and assurance, network reliability and network security, computer systems and computer system administration. Organizations, such as American Society for Information Science and Technology (ASIS&T), serve to promote the field of IS including through standardization. Up to this point the efforts have been directed primarily to ways to better collect, process, track, classify, cluster and distribute information and documents—in essence, the efforts have been focused on the documents and organizing the documents and content.

In today's business environment, information is of critical importance. But all information is not created equal and certain types of information are more important and more valuable than other types of information. Moreover, circumstances and purpose may determine when certain types of information and documents are "more or less" important than other types of information. One type of information which is highly valuable and highly prized is relationship information. A relationship is a piece of information that indicates an association or link (e.g., business, professional, social, familial, or personal relationship or related connection) between an individual or entity and another individual or entity. In the business environment, the most valuable type of relationship is a relationship that facilitates or supports the initiation, forward progress, or successful conclusion of a business dealing. Given that a transaction between two parties cannot begin until the parties are somehow brought together, relationships are vital pieces of information which can catalyze a business deal between two or more entities. For this reason, the relationship information held by an individual, an enterprise or a community is highly valuable.

The information about a particular individual or entity is contact information. The links between contacts may be defined or represented as relationships. Commercial software providers have developed a number of different software tools that allow individuals and entities to manage their contacts, store their contacts, and share their contacts. Examples of such tools include InterAction, Outlook, and ACT. Some of these tools also have simple functionality to represent rudimentary relationship information, although they are typically time consuming to administer, difficult to set up and laborious to employ. Each typically requires that a new database be developed, maintained and serviced. For example, in Outlook relationships can be represented by notes in the body of contact cards stored in a public folder. Only then is the system available for users to search through to find relationships of interest.

Moreover, these systems fail to distinguish between a valuable relationship and a less valuable contact, unless a user has manually entered a suitable note to that effect. In other words, each relationship is treated the same, with no measure of relative strength. Consequently, when a user employs these tools it is difficult for the user to distinguish between relationships that are likely to be helpful, and relationships that are unlikely to be helpful. Additionally, even if a user enters information about the value or relative strength or importance of a relationship, there is no reliable way to distinguish or measure the strength of a relationship to the same person or entity entered by two different users. There is no basis or system for ensuring an objective method of how different users subjectively perceive or measure relationship strength.

An additional drawback with these existing systems is that they fail to provide desirable privacy protection for all participants in the system. Both the privacy provided and the flexibility in choosing privacy levels are inadequate. Even systems that do allow for some degree of flexibility in choosing privacy levels are too difficult and complex and impractical in practice. Current systems with complex privacy controls are underutilized. For example, the existing systems may sweep through the electronic address books of different individuals in an enterprise and take the collected information to form a database that is completely open: once the information is stored in the database any user can come and search that database to find a contact of interest and see the detailed contact information without informing the original 'owner' of that contact. As such, individuals are hesitant to put information into an electronic address book or other system that can get swept into a publicly available or enterprise wide contact system that will allow anyone to directly contact people they have personal relationships with. As individuals then use their electronic address book systems only for a portion of their contacts, the collected relationship information is incomplete. What is needed is a system that can share information and provide appropriate level of security and privacy without requiring a user to actively manipulate and/or set up the system.

Existing contact systems fail to meet the need of organizations to better leverage relationships existing within its community. Contact management systems do not adequately capture and rank relationships, they require manual entry and updating, and they do not provide adequate privacy protection for all participants. Current contact management systems require substantial manual intervention, do not readily provide meaningful results, are difficult to search in a meaningful way and produce a subjective result. Using current technology, it is difficult to determine which contacts are identified with which entities, and which relationships are both valid and meaningful. These drawbacks, and others, make them poor tools for discovering contacts and relationships of participants in the network system.

Additional drawbacks in existing networking products (e.g., Facebook, LinkedIn, MySpace, Twitter) are opt-in, user-directed creation and maintenance of relationships. What is lacking is a centralized function that provides and maintains a central or "master" user profile to facilitate efficient delivery of meaningful and timely information to assist individual users, as well as their employers, in their various professional and personal pursuits.

SUMMARY OF THE INVENTION

Accordingly, there is a need in the art to provide a system that allows organizations to more fully realize and leverage the relationships that its members can provide. The fields of Information Services and Information Science, and the related areas of Data Processing, Information Processing, Management Information Systems, Management Information Services and Information Technology, are collectively referred to herein as "IS." While there has been much discussion concerning IS and the relationship between information science and technology, only recently have scholars and others begun to recognize a separate field of relationship science. Some may suggest that advertising and marketing are inherently driven by the need to establish a positive relationship between a product or service and the consumer, but traditionally this has been on a mass or general basis with a growing trend toward more targeted marketing. In the context of content delivery, traditionally this has been on a selective, consumer driven model with a growing trend to deliver content based on individual opt-in platforms and on user-directed searching techniques. What has been missing is a higher level intelligent agent to predict individual needs and interests and to deliver "Intelligent Information." The present invention provides a more powerful system for delivering content to an individual based on a heightened awareness of the individual and of the individual's activities, profession, relationships, calendared events, professional research and other activities, team or other group associations, personal life, and goals. The invention factors, among other things, an individual's activities and weighs these factors based on, for example, temporal relevance. In one manner, the invention provides a system that can generate and maintain one or more user profiles for organizing and presenting the relationship information of the user associated with the user profile. The user profile of the present invention is created and maintained by a "self-aware" or intelligent computer-based agent that is capable of monitoring the various user accounts associated with a user and updating/revising the user profile associated with the user to better serve the needs of the user and any enterprise related to the user.

In one manner of implementation, a computer-based intelligent agent possesses a level of awareness of individual users, for instance each individual's background (professional, educational, personal), interests, schedule, work tasks, and contacts. A central service provider, for instance, could be a centralized provider of the intelligent agent that establishes, updates, and maintains central or "master" individual profiles. The central provider could push and/or pull content to/from enterprise systems or other professional service provider systems. An individual may have, e.g., an individual "dashboard" or the like that serves as a user interface to coordinate among the user profile provider and a multiplicity of other service providers, e.g., professional and other content/search providers, publicly available content providers, regulatory content/service providers, and firm, corporate or in-house systems. The profile may include the capability of seamlessly accessing content (fee-based, subscriber-based, or otherwise) in either of a selective or automated fashion. For instance, the profile's awareness of the individual can extend to preferences of sources for content and information and can include subscription related authorization data, e.g., login and password information. Each individual may have multiple agents, or sub-agents, associated with his/her profile, e.g., professional and personal agent. In one manner, the central or master profile acts as an intelligent overlay to access and extract information and present relevant information and services to the user, including accessing networking products and services that provide opt-in, user-directed creation of relationships.

The intelligent agent searches and collects information of interest from content providers on behalf of the individual. The agent includes a predictive function based on the understanding of the individual and processing internal-accessible information, e.g., Outlook calendared meeting on Oct. 21, 2010, with Jack Jones, and external information. For instance, the intelligent agent accesses information about Jack Jones, e.g., through one or more websites/databases, including publicly available websites and/or through authorized subscription websites/databases. Existing TR products, services and databases dovetail nicely with this aspect of the intelligent agent invention, e.g., PeopleCite, Profiler products/processes may confirm the particular "Jack Jones" based on employer information, phone number, address information, patent number, case number, etc. The agent would then, for example, package information believed to be of interest about Jack Jones for delivery to the individual prior to the meeting. The deliverable could include options for selective access by the individual, including accessing fee-based services and/or information. By being aware of the individual, e.g., David Scott—patent attorney, and by being aware of the subject of interest, Jack Jones, the agent can selectively deliver information believed to be of interest, e.g., list of patents by Jack Jones, list of patent litigation cases involving Jack Jones. The agent could also access local, state, federal and other databases to discover that the company owned by Jack Jones was issued a building permit for a particular use, which could then be reported to the individual. The deliverable may include new feeds related to the subject of interest, e.g., articles, blogs, etc. relating to Jack Jones.

Described herein are systems and methods for providing relationship collaboration systems that allow a user to identify whether a community has a member with a relationship of interest to that user. The systems then provide communication channels, and optionally anonymous channels, that allow the user to inform the contact owner of a request for an introduction, or for more information, and to provide the contact owner more background information about the purpose of the request.

As will be described more fully, the relationship collaboration systems and methods described herein are automated systems that are capable of accessing different databases maintained within the enterprise for the purpose of building a relationship database that can be employed in a manner that allows users to search for potentially valuable relationships that their colleagues may have, and also maintains a contact owner's ability to keep their contacts private and to choose when information about their contacts is shared. The systems and methods also provide for a system capable of generating a relevant factor indicative or representative of the significance or strength of a particular relationship in the database. As such, the results of a query can be returned as a ranked list of colleagues, with the colleagues who are mostly likely to have valuable relationships, for example, earliest in the list.

In a further optional embodiment, the systems and methods described herein include user settings that allow a contact owner to control when access will be granted to their contacts. To this end, the systems and methods described herein can respond to a query for relationships from a user by generating a ranked list of contact owners that have what appears to be a relationship of interest to the user, and allow the user to identify the contact owner and to request permission to use that contact. In a further optional embodiment, the contact owner list may be anonymous in that a pseudonym is provided to identify some or all contact owners, thereby protecting the identity of the contact owner from individuals wishing to solicit access or use of their contacts.

In one exemplary embodiment, the invention provides a computer-implemented method of maintaining a database of user profiles based, respectively, on user interaction with third-party systems, the method comprising: accessing a unique user profile associated with a unique user; automatically collecting, by an agent module executing on a processor associated with a first system, data associated with the unique user based at least in part on the unique user's interaction with a system unassociated with the first system; evaluating by the processor the collected data and searching available databases to identify potential items of interest to the unique user based at least in part on the unique user profile and the collected data; determining a set of predicted items of interest to the unique user from the identified potential items of interest; and presenting at a display associated with the unique user data representing the set of predicted items of interest.

This embodiment may be further characterized as follows. The step of automatically collecting by an agent module data associated with the unique user may further include accessing and searching user account data associated with the unique user, and further wherein the user account data includes one or more of email, calendar, contacts, and phone record accounts and still further wherein the user account data includes one or more of: an entry in a calendar program indicating a scheduled meeting with a first entity; a contact record representing the first entity; an email including an email address associated with the first entity; and an email containing a name or other identifier associated with the first entity; a billing system entry containing client, billing, time or related data; a customer relationship management (CRM), also referred to as an entity or enterprise relationship management (ERM), system entry containing contact, company, activity or related data; a phone call record; a travel system entry containing travel plans, reservations and related data; click stream data; and application usage data. The set of predicted items of interest to the unique user may include content concerning a first entity, the content being one or more of biography, article, caselaw, website, regulatory filing, financial reporting, transcripts, interviews, competitive intelligence, trading data, related analytics, third-party reports, and related internal data, such as CRM activities, experience data and related proposals. Moreover, the method may include accessing and searching data maintained within an organization or accessing databases outside of an organization associated with the unique user. The evaluating collected data and searching available databases may include accessing one or more of: publicly available content database; subscriber-based content database; fee-based content database; professional service provider content database; government maintained database; and regulatory database, and may further include using secure sign-in data associated with the unique user to automatically access a database via a secure sign-in procedure, and still further wherein the secure sign-in data includes user login identifier and password data associated with the unique user. The method may further include using user profiles associated with one or more of professional networking sites (e.g., LinkedIn) and social networking sites (e.g., Facebook, MySpace) to collect professional and/or personal data associated with the user or an entity linked to the user.

The method of this embodiment may further include determining based at least in part on the collected data a first entity, the set of predicted items of interest being related to the first entity and still further include evaluating the strength of relationship between the first entity and the unique user. The collected data may include contact information associated with the first entity, unique user information and one or more values related to strength of relationship between the first entity and the unique user. The method may further include: comparing the first entity with an authority database to validate the identity of the first entity; comparing the first entity with one or more databases to determine a confidence level used to associate the first entity with a known entity; performing a disambiguation process on the first entity to validate the identity of the first entity; performing a data cleansing, to eliminate false positive identification of entities, such as separating spam mail from real emails; performing one or more of Bayesian, idf, and TF-idf, processes on the identified potential items of interest; performing, in a network-wide context, analysis of entities extracted from the item (for example, prioritizing information not just by a particular entity, but based on additional factors like industry, location, prospect/client status of the organization, etc.); presenting links to one or more of document, webpage, database; automatically generating and transmitting an email to an email account associated with the unique user; automatically incorporating into a calendar event associated with the unique user a set of one or more links to one or more of the predicted items of interest; automatically generating and presenting via a user dashboard associated with the unique user links to one or more of the predicted items of interest; presenting the unique user with a user interface adapted to enable the unique user to dynamically select and/or deselect certain ones of the predicted items of interest. Also, based on the unique user taking an action related to the predicted items of interest, the method may collect data associated with the user action and update the user profile based on the collected data associated with the user action. The method may be performed in either a periodic or a real-time manner and may further include: building a user profile via algorithms to segment and rank the areas of interest to a given user; modifying the user profile based on user's reactions to the presented data; identifying similar user profiles as a potential additional source of predicted items of interest, based on users' reactions to presented data; accessing by a first external provider system a first user profile maintained by the database; receiving data derived from a first external provider system and concerning an entity associated with a first user profile maintained by the database; revising the first user profile based on the data received from the first external provider system.

In another exemplary embodiment, the invention provides a computer-based system for maintaining a database of user profiles based, respectively, on user interaction with third-party systems. The system comprising: a server comprising a processor and a memory adapted to store executable program instructions and data; a database comprising a plurality of user profiles, each user profile being unique and being associated with a unique user entity, the server adapted to access the database and to receive inputs; an agent module comprising a first set of code executable by the processor and adapted to process data associated with the unique user based at least in part on the unique user's interaction with an unassociated system; a second set of executable code adapted to evaluate collected data and search available databases to identify potential items of interest to the unique user based at least in part on the unique user profile and the collected data; a third set of executable code adapted to determine a set of predicted items of interest to the unique user from the identified potential items of interest; and a fourth set of executable code adapted to present at a display associated with the unique user data representing the set of predicted items of interest.

This embodiment of the invention may further comprise: means for accessing by a first external provider system a first user profile maintained by the database; and/or means for receiving data derived from a first external provider system and concerning an entity associated with a first user profile maintained by the database. The system may be adapted to revise the first user profile based on the data received from the first external provider system.

In yet a third exemplary embodiment, the invention provides a computer-readable medium comprising code adapted to maintain a database of user profiles based, respectively, on user interaction with third-party systems. The computer-readable medium comprising code for execution by a server comprising a processor and a memory adapted to store executable program instructions and data and having an associated database comprising a plurality of user profiles, each user profile being unique and being associated with a unique user entity, the server adapted to access the database and to receive inputs. The computer-readable medium comprising an agent module comprising a first set of code executable by the processor and adapted to process data associated with the unique user based at least in part on the unique user's interaction with an unassociated system; a second set of executable code adapted to evaluate collected data and search available databases to identify potential items of interest to the unique user based at least in part on the unique user profile and the collected data; a third set of executable code adapted to determine a set of predicted items of interest to the unique user from the identified potential items of interest; and a fourth set of executable code adapted to present at a display associated with the unique user data representing the set of predicted items of interest.

There are other aspects of the invention that will be evident to the skilled artisan from the following description.

BRIEF DESCRIPTION OF THE DRAWING

In order to facilitate a full understanding of the present invention, reference is now made to the accompanying drawings, in which like elements are referenced with like numerals. These drawings should not be construed as limiting the present invention, but are intended to be exemplary and for reference.

FIG. 8 is an exemplary screen shot of an ERM user interface (UI) associated with a user profile.

FIG. 14 is an exemplary screen shot of the UI of the ERM which provides personalized news summaries and presents contact information.

FIG. 25 is an exemplary screen shot of the UI of the ERM showing the people profile pages contain three main elements: the contact information section, the relationship information section, and the News section.

DETAILED DESCRIPTION OF THE INVENTION

Figure 1:
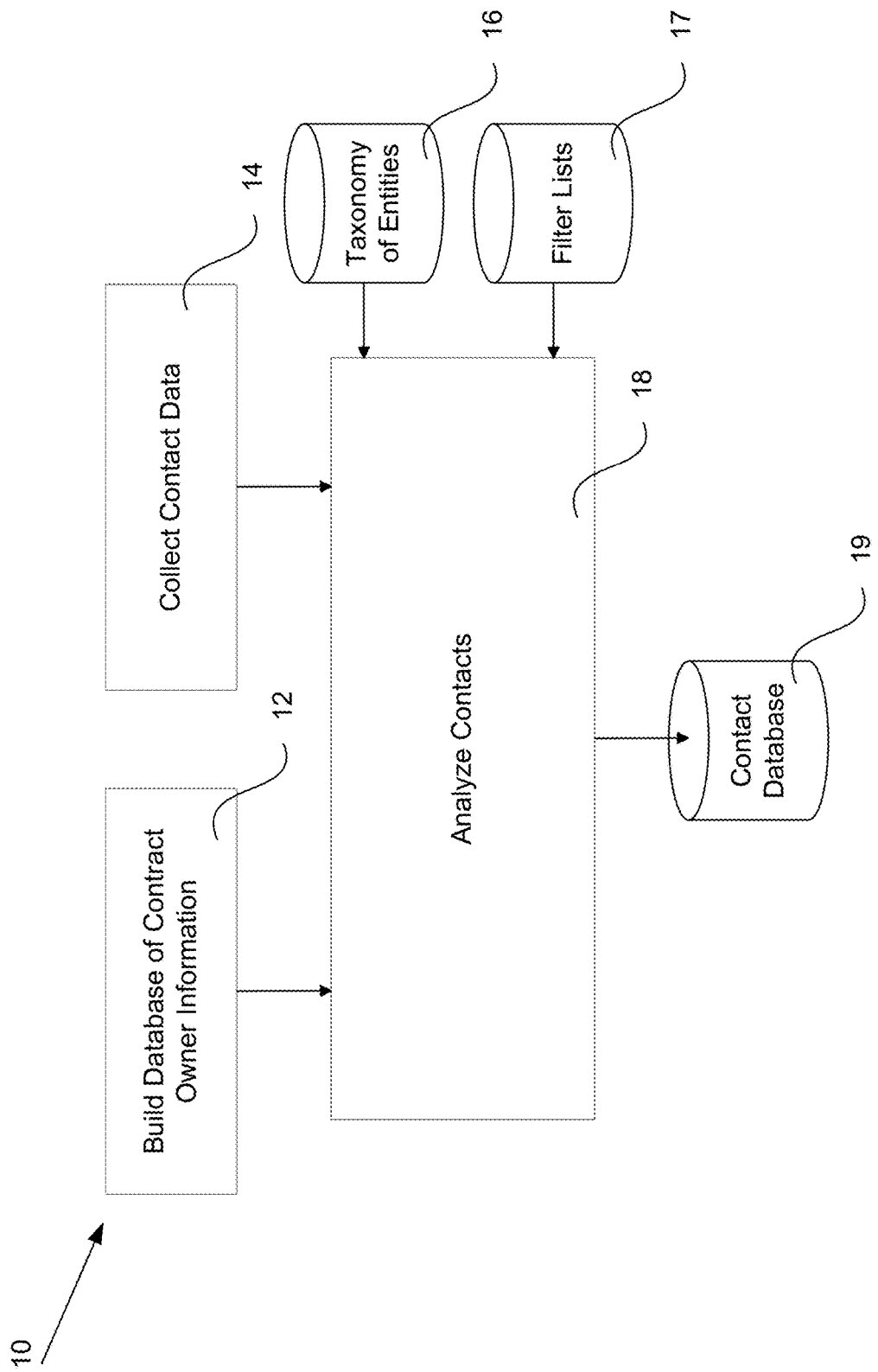
FIG. 1 depicts a flowchart of one process for building a relationship database.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

The block diagram of FIG. 1 depicts an illustrative process 10 for building a relationship database. In process 10 contact data is collected and processed in order to create a relationship database 19. In operation 12, the process 10 collects information from sources held by or related to contact owners, for example, from an electronic address book that stores information such as the names of individuals and entities that are known to the contact owner. Sources typically include contact data about individuals and entities such as phone numbers, mailing addresses and email addresses and may also include some descriptive information such as an individual's job title and employer.

The illustrative process 10 also, in operation 12 may collect contact information from email traffic observations, web site visits and the like. The process 10 can, for example, monitor email traffic.

Email and other electronic communication traffic is routed to destinations from sources using structured identifiers such as email addresses and domain names. These identifiers conform to one or more conventions of computer networking to uniquely identify the destination and/or source of a particular message. Email addresses and domain names are conventionally associated with individual entities, for example, a person is referred to by an email address and a company by a domain name.

In a typical operation, the system will monitor email traffic associated with different contact owners and will record the email addresses to which correspondence was being sent and from which correspondence is being received. In this way, the process 10 in operation 14 can begin to analyze 18 the contact information and to build a database 19 of the different organizations with which members of their enterprise, i.e. the contact owners, are communicating. For example, email traffic may occur between members of the enterprise and organizations such as Microsoft, Fidelity, Walmart, various colleges, and other such organizations and entities, hereinafter referred to collectively as entities. The domain name associated with the email addresses may be recorded during operation to create a comprehensive list of the domains with whom the members of the enterprise are communicating. Additionally, and optionally, the system can draw an association between different entities and different ones of the domain names being recorded, also including drawing an association between individual email addresses and individual persons.

The illustrative process 10 also, in operation 12 may collect and analyze information from other data sources, such as customer relationship management systems, biographical information such as resumes, other databases, phone logs, access logs for web browser clients, network traffic logs and contact data that can be used to establish relationships between contact owners and contacts as well as corresponding entities. This can include information such as resume or curriculum vitae (CV) information indicating other companies or organizations the contact owner has worked at before or schools that contact owner has attended, clubs they are affiliated with, and other such information. As such, contact owners are themselves part of the contact community and the information about them will be used to evaluate contact quality, as explained below.

Optionally, the classification information can be stored in a dynamically updated taxonomy database 16 of useful and/or not useful domains, email addresses and/or associated entities.

Optionally, the illustrative process 10 in operation 18 can filter the contact data, for example by domain name or email address data for the purpose of identifying domains and email addresses that are truly representative of relationships to those associated entities. For example, the system can go through and remove domains, such as Yahoo.com or Hotmail.com, that are associated with free email servers and not with organizations of potential interest to users who will query the relationship collaboration system. Additionally, the system can sort through and identify email addresses that represent the Amazon orders department, the Dell help desk and other email addresses that are not really representative of meaningful contacts at the entity associated with the domain of the email address. The filter list 17 against which contact information is filtered can be stored as a simple list, a set of topical rules, computer code, or database. In this way, operation 18 builds the relationship database 19 from email traffic observations that has been filtered to remove that traffic which provides little value or is potentially misleading to the relationship collaboration system.

Operation 14 collects information about the contact owners. Each person in the enterprise that may have a set of contacts or relationships which are available to be included in the relationship collaboration system is understood as a contact owner. The relationship database 19 is built by analyzing 18 the contact data 12 collected and associating relationships with contact owner information collected 14.

Operation 18 consolidates the different information collected by operations 12 and 14 into the relationship database 19, optionally using and also improving the taxonomy of entities 16 and the filter lists 17. This database 19 can then be queried by a user and the results can be scored and returned to the user.

Figure 2:
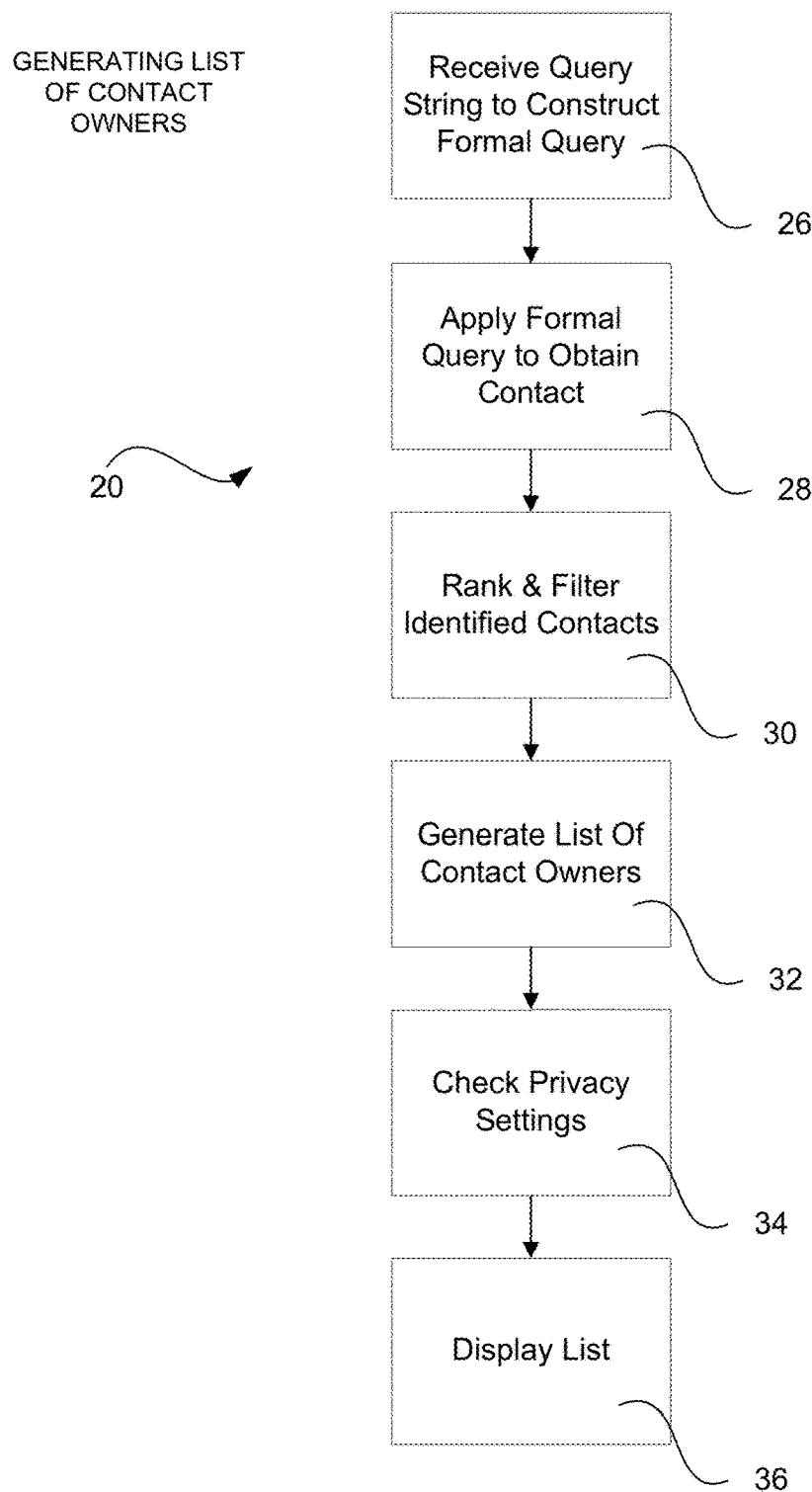
FIG. 2 depicts a flowchart diagram of one process for generating a list of contacts, relationships, or contact owners in response to a query.

Turning now to FIG. 2, one illustrative process for generating a list of contact owners is depicted. Specifically, FIG. 2 depicts an illustrative process 20 that begins at a first step 26 where the process 20 receives a query string to find a relationship. The query string can be any suitable query string, such as may be applied to search engines and databases, for example. The query string can be processed by any suitable process to identify a set of table searches that can be used for applying the query to the database to return a set of results which are associated with that query. For example, a user can enter a query based on a target individual's name, a company name, a title or role, an industry, a political party, a community organization, a profession, a geography or any other kind of information that might be relevant to the user. The process 20 in step 26 can use that query to construct a formal query, i.e. a set of instructions, for example, SQL instructions or instructions in any suitable query language or format that can be applied to the database for the purpose of pulling the information that is relevant out of the database. In operation 28 the illustrative process 20 does just that and then it processes the query string and it uses it to identify a set of contacts stored in the database that are relevant to that query.

After operation 28 the illustrative process 20 proceeds to operation 30 wherein the relationships between each identified contact and each contact owner are scored according to the strength of those relationships and then ranked according to those scores.

The illustrative embodiment shown in FIG. 2, operation 30 scores the results by heuristically determining the relevance of the relationship between a contact owner and a contact. An example of a heuristic rule that might be used could be expressed as follows: if the contact data found in the address book of a particular contact owner is relatively old information, as determined for example by the date it was last modified, and yet from email traffic it can be seen that the contact owner still regularly communicates with that contact and from looking at the human resource information about that contact owner it can be seen that the contact owner used to be employed at an organization associated with that contact, then the relationship to an entity with which the contact is associated (by domain name, for example), may be deemed to be highly significant as the heuristic data indicates a strong relationship between the contact owner and the contact. Such a heuristic rule might be expressed algebraically as a linear relationship among the data in which data of different types may be weighted by different coefficients. Accordingly, when scoring relationships, operation 30 applies a set of algebraically expressed heuristic rules to score or rank the relationship information being stored in the database.

As described above, different heuristic rules can be applied, including heuristic rules that take into consideration how long the contact has been stored, how frequently it has been accessed, how recently it has been accessed or modified, whether the contact owner appears to have an identifiable association with the contact or entity, the type of association such as duration, frequency, recency or role, the amount and type of contact data, the pattern and frequency and recency of communication, and other such information. The set of rules can be updated adaptively using any suitable learning process. It will also be apparent to those of skill in the art that any suitable set of adaptive or deterministic heuristic rules may be employed and the actual rules applied will vary according to the application. Thus the invention is not to be limited to any set of heuristic rules, whether deterministic or adaptive. The scoring of relationship strength can be done as a part of operation 30 or optionally it can be done in part or in whole in operation 18 of process 10, or optionally it can be done in part or in whole as a separate process.

In operation 30 the process 20 in addition to ranking the relationships based upon the computed quality, can also filter the ranked list for the purpose of removing from the identified relationships those relationships which fall below a particular threshold of relevance or quality. In this way, a reduced set of relationships is identified but these relationships are more likely to be meaningful and of interest to the user. After operation 30 the process 20 proceeds to operation 32 wherein the process generates a list of the contact owners associated with the different relationships. In this way a list is generated which optionally does not actually provide contact information to the user in response to their query but could instead give them pointers to the individual contact owners that have the contact information and may be willing to grant access.

In operation 34 the process 20 also checks privacy settings. The process 20 can determine whether a particular contact owner has decided to remain anonymous, either in total, or just in association with a particular contact or set of contacts. In this way, a contact owner that has a highly desirable contact may provide the information to the contact manager system without fear that he or she will be pressured to give access to a valuable, and perhaps sensitive, contact. In step 34, the actual contact owner's name can be removed entirely and replaced with an anonymous key or pseudonym which does not identify the contact owner to the user but which can be used by the system for opening up a channel of communication between the user and the contact owner. A contact owner can subject themselves to a global privacy policy applied across an enterprise, a group policy, a personal policy, and a policy that defines when a particular contact's or entity's information and what parts of that information will be shared.

As an example, the global privacy policy may be nothing more than to mask the contact owner, as previously mentioned. The sales force group privacy policy may restrict access to any contact identified as a sales lead to members of the sales force group. An individual member of the sales force may choose to restrict access to a sensitive personal contact either entirely, or to reveal only their business information. The individual member of the sales force can set or clear privacy policy flags on groups of owned contacts, on individual owned contacts, or items of information in individual contacts or on types of information in individual contacts or groups of contacts. Global and group policies can be similarly varied, if desired.

In operation 36, the process displays this list of contact owner information, including reference to anonymous contact owners, to the user in response to their query. References to anonymous contact owners can include links to anonymous communication methods for requesting further information without breaking the contact owner's privacy. Optionally, the display list may also include some generic information about the different relationships such as its relevance, whether the contact owner has a personal or business relationship, whether the contact owner has a recent relationship or active relationship, the source or method by which the system is aware of the relationship, and other kinds of information. Also, this information may be used to sort the display list of contact owners. Optionally, the system may also display additional information about the contact owners, such as their title, office location, phone number and email address.

Figure 3:
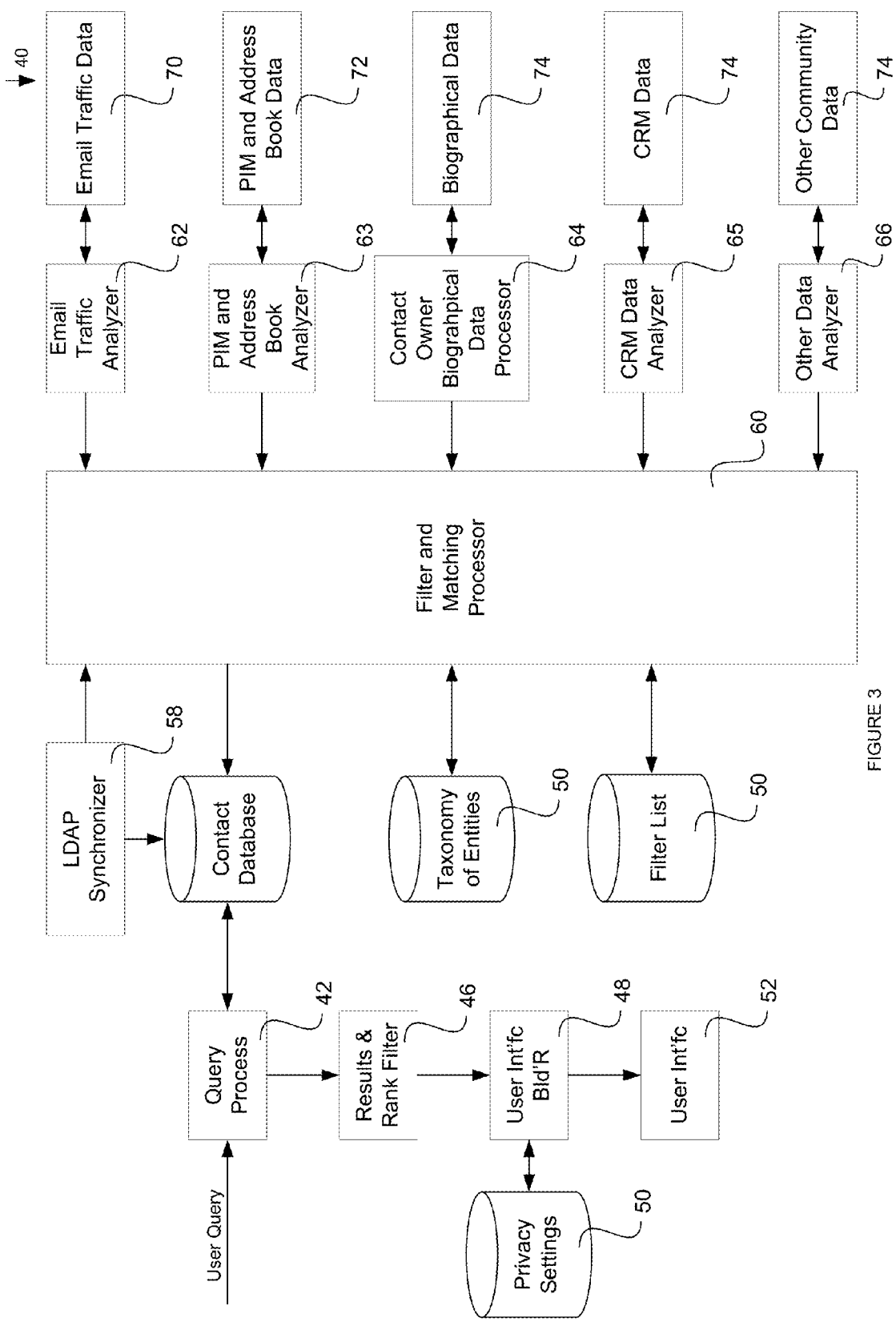
FIG. 3 depicts one embodiment of a system according to the invention for managing contacts on an enterprise wide basis.

FIG. 3 depicts a system 40 according to aspects of an embodiment of the invention for generating a relationship database 54 and for querying that relationship database 54 so that users can identify contact owners within their community that have relationships of interest to that user. Specifically, FIG. 3 depicts a system 40 that includes a front end user interface system which includes a query process 42, a results rank and filter process 44, a user interface builder 48, a database of privacy settings 50, and a resultant user interface 52. As also shown in FIG. 3, the system 40 includes a relationship database 54 that includes the contact owner list 58 and is built in filter and match processes by a process 60. As further shown, the filter and match process receives information from an email analyzer 62, a personal information manager (PIM) and address book contact analyzer 63, a contact owner biographical data analyzer 64, a CRM data analyzer 65 and any other suitable data analyzers 66. These different processors coupled to different individual, community or enterprise data sources which are represented in FIG. 3 by data sources including email traffic data 72, electronic PIMs and address books 73, contact owner resumes or human resource (HR) database records 74, CRM data 75 and other community data 76. Other suitable data sources of the desired scope may be used.

As described above with reference to FIGS. 1 and 2, the system 40 depicted in FIG. 3 is capable of supporting or implementing a set of processes that can process community or enterprise information, such as the data sources 72, 73, 74, 75 and 76 for the purpose of developing information of contacts and relationships which can be stored in the relationship database 54. In FIG. 3, the email analyzer 62, optionally with the filter and match processor 60, is capable of processing information from email data source 72 to determine the set of email addresses and domain names and therefore individuals or companies or entities or associated organizations with whom members of the community have a relationship. The email analyzer 62 can be a plug-in capable of plugging into Microsoft Outlook or Microsoft Exchange or some other email client or server program or it can be a program that analyzes log data generated by an email client or server program and it should be capable of sorting through email databases and logs of information to record the addresses and domains identified in email records, determine statistical information about the amount of contact with a particular address or domain, the duration of the contact, the time of the most recent contact, and other kinds of information which, when processed heuristically, may be used to get a sense of how robust or strong the contact owner's relationship with the entity associated with the email address or domain may be. The processor 60 also filters the list of email addresses and domains to determine those that are relevant to the contact database. Processor 60 can be used to filter and match various contact data and relationships using a taxonomy 55 and store them in a relationship database 54. Processor 60 can also update and improve the taxonomy 55 and the filter list 56.

Similarly, in the illustrative embodiment of FIG. 3 a contact analyzer 64 may be a software process that acts as a program connected to Microsoft Outlook or Microsoft Exchange or some other electronic address book or contact manager system that can process information stored within the data source 72 to identify a set of contacts that members of the community have included or identified as persons or entities with whom they have some contact information or relationship. Using the contact analyzer 64 may develop an association or relationship between different members of the community and different contacts.

FIG. 3 further depicts that in this embodiment the system 40 includes a biographical data analyzer 64. This data processor 64 incorporates individual resumes and communicates with the human resource data source 74 and collects information about the contact owners within the community. This information can include resume information, work history information, company account information, professional association information, and any other kind of information that may be helpful to the system 40 to determine heuristically or deterministically a relationship between the contact owner and a contact or entity. FIG. 3 further depicts a CRM data analyzer 65 and other data analyzers 66 that also incorporate data and use a processor 60 to establish relationship metrics between contact owners and contacts and corresponding entities. FIG. 3 depicts a contact owner synchronizer 58 that is used by the processor 60 to define the community of contact owners in the relationship database 54. The contact owner synchronizer 58 can use any standard user directory 59 such as Microsoft Active Directory, an LDAP directory, or a text file list of users. Aspects of the processes of FIG. 3 described up to this point can be embodied in the arrangement discussed above in connection with FIG. 1. Aspects of the following processes of FIG. 3 can be embodied in the arrangement discussed above in connection with FIG. 2. The illustrative system 40 depicted in FIG. 3 also includes a front end 42 that is capable of processing a user query for the purpose of searching through the relationship database 54 and providing to the user a list of contact owners within their community that have a relationship that may be of interest to the user. As shown in FIG. 3, the front end can include a query process of the kind commonly employed for receiving a set of key words or search string from a user and for parsing that search string into a set of terms that can be applied to fields within the relationship database 54.

After the query process 42 applies the query to the relationship database 54, the results are returned and forwarded to the process 44 that sorts through the results of the search and ranks the results in an order that presents, in this embodiment, the most relevant and highest quality relationships first. Once the list is ranked, the process 44 may apply a filter that sorts through the ranked list of relationships and identifies those relationships which fall below a threshold of relevance or quality and therefore can be removed from the list. In this way a reduced number of relationships, all meeting certain quality standards, may be identified and used. After process 44, the process 48 may take the results and generate a web page 52 that presents to the user the names of contact owners, or a unique identifier for a contact owner that is associated with a relationship appearing within the list generated by process 44. As shown in FIG. 3, in this illustrative embodiment, the process 48 accesses privacy settings stored in database 50 for the purpose of identifying those contact owners that wish to remain anonymous and any other sharing or restrictive rules that may be defined. To this end, the process 48 can identify a list of contact owners that are associated with the relationships found by process 44 and can generate a list that either includes a name of a contact owner or an identifier for a contact owner that hides the identity of the contact owner but identifies that contact owner to the system 40. Information can be hidden or exposed in accordance with the most restrictive applicable policy, for example.

Once that information is created by process 48, the user interface 52, e.g. a web page or other interface such as a program on the user's computer or a set of data to embed in another computer program, is created and presented to the user. In one such web based system, the system 40 depicted in FIG. 3 comprises a network based system that includes a plurality of data sources that connect through a network, such as an enterprise local area network, or any suitable network to a server system containing the analyses, processors, databases and search result components. Client systems can also be used to send search queries and view results.

In one illustrative embodiment, the system 40 depicted in FIG. 3 is implemented as a relationship collaboration tool that allows a user to use a conventional internet browser client, such as the Microsoft Internet Explorer browser to enter queries and receive results to those queries. The client systems can be any suitable computer system such as a PC workstation, a handheld computing device, a wireless communication device, or any other such device, equipped with a network client capable of accessing a network server and interacting with the server to exchange information with the server. In one embodiment, the network client is a web client, such as a web browser that can include the Netscape web browser, the Microsoft Internet explorer web browser, or a proprietary web browser, or web client that allows the user to exchange data with a web server, an ftp server, a gopher server, or some other type of network server. Optionally, the client and the server rely on an unsecured communication path, such as the Internet, for accessing services on the remote server. To add security to such a communication path, the client and the server can employ a security system, such as any of the conventional security systems that have been developed to provide to the remote user a secured channel for transmitting data over the Internet. One such system is the Netscape secured socket layer (SSL) security mechanism that provides to a remote user a trusted path between a conventional web browser program and a web server. Optionally the client and server systems have built in 128 bit or 40 bit SSL capability and can establish an SSL communication channel between the clients and the server. Other security systems can be employed, such as those described in Bruce Schneier, Applied Crytpography (Addison-Wesley 1996).

The server may be supported by any suitable commercially available server platform such as a Sun Sparc™ system running a version of the Windows, Unix, Linux or other operating system and running a server, such as an SQL database server including any SQL, MS Access, or the like, capable of connecting with, or exchanging data with, one of the client systems. Computer systems and platforms suitable for embodying the invention are described more fully, below. In one embodiment, the server includes a web server, such as the Apache web server or any suitable web server. The web server listens for requests from client systems, and in response to such a request, resolves the request to identify a filename, script, and dynamically generated data that can be associated with that request and to return the identified data to the requesting client. The operation of the web server can be understood more fully from Laurie et al., Apache The Definitive Guide, O'Reilly Press (1997). The server may also include components that extend its operation to accomplish the transactions described herein, and the architecture of the server may vary according to the application.

The server may couple to the relationship database 54 that stores information representative of relationship information as well as information about a user's account, including passwords, user privileges, privacy settings and similar information. The depicted database may comprise any suitable database system, including the commercially available Microsoft Access database, or Microsoft SQL-Server or open source mySQL server, and can be a local or distributed database system. The design and development of database systems suitable for use with the system 40, follow from principles known in the art, including those described in McGovern et al., A Guide To Sybase and SQL Server, Addison-Wesley (1993). The database 54 can be supported by any suitable persistent data memory, such as a hard disk drive, RAID system, tape drive system, floppy diskette, or any other suitable system. The illustrative system 40 depicted in FIG. 3 includes a database device that is separate from the server station platform, however, in other embodiments the database device can be integrated into the server or, other suitable architectures can be used.

The System 40 described herein can be supported by a conventional data processing platform such as an IBM PC-compatible computer running the Windows operating systems, or a SUN workstation running a Unix operating system. Alternatively, the data processing system can comprise a dedicated processing system that includes an embedded programmable data processing system. The architecture selected can vary according to the application. Accordingly, although FIG. 3 graphically depicts the relationship collaboration system as functional block elements, it will be apparent to one of ordinary skill in the art that these elements can be realized as computer programs or portions of computer programs that are capable of running on a data processor platform to thereby configure the data processor as a system according to the invention. The software programs can be implemented as C language computer programs, or computer programs written in any high level language including C++, Fortran, Java or Basic.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other suitable type of processor. It should be appreciated that one or more of any type computer system may be used to store, collect, process, rank and display contact information according to various embodiments of the invention. Further, the relationship collaboration system may be located on a single computer or may be distributed among a plurality of computers attached by a communications network.

A general-purpose computer system according to one embodiment of the invention is configured to perform any of the described relationship collaboration functions including but not limited to storing, collecting, processing, ranking and displaying contact information. It should be appreciated that the system may perform other functions, including network communication, and the invention is not limited to having any particular function or set of functions. For example, various aspects of the invention may be implemented as specialized software executing in a general-purpose computer system 80 such as that shown in FIG. 4. The computer system 80 may include one or more processors 83 connected to one or more memory devices 84, such as a disk drive, memory, or other device for storing data. Memory 84 is typically used for storing programs and data during operation of the computer system 80. Components of computer system 80 may be coupled by an interconnection mechanism 85, which may include one or more busses (e.g., between components that are integrated within a same machine) and/or a network (e.g., between components that reside on separate discrete machines). The interconnection mechanism 85 enables communications (e.g., data, instructions) to be exchanged between system components of system 80.

Figure 5:
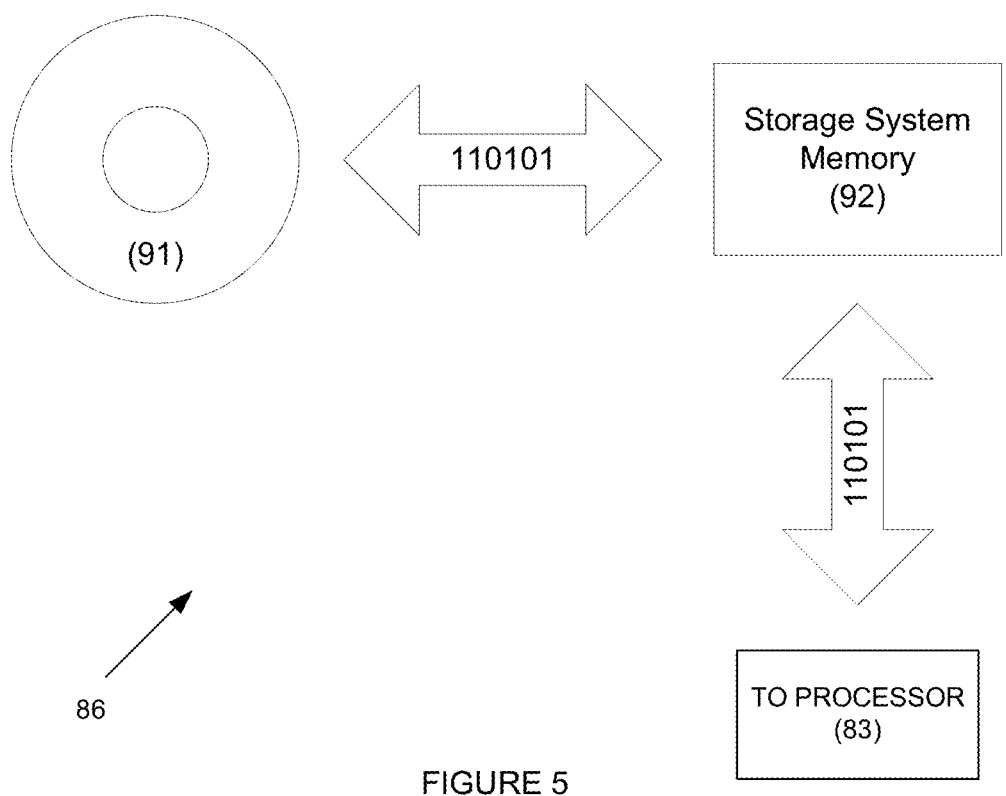
FIG. 5 is a block diagram of the storage system of the computer system of FIG. 4.

Computer system 80 also includes one or more input devices 82, for example, a keyboard, mouse, trackball, microphone, touch screen, and one or more output devices 81, for example, a printing device, display screen, speaker. In addition, computer system 80 may contain one or more interfaces (not shown) that connect computer system 80 to a communication network (in addition or as an alternative to the interconnection mechanism 85). The storage system 86, shown in greater detail in FIG. 5, typically includes a computer readable and writeable nonvolatile recording medium 91 in which signals are stored that define a program to be executed by the processor or information stored on or in the medium 91 to be processed by the program. The medium may, for example, be a disk or flash memory. Typically, in operation, the processor causes data to be read from the nonvolatile recording medium 91 into another memory 92 that allows for faster access to the information by the processor than does the medium 91. This memory 92 is typically a volatile, random access memory such as a dynamic random access memory (DRAM) or static memory (SRAM). It may be located in storage system 86, as shown, or in memory system 84, not shown. The processor 83 generally manipulates the data within the integrated circuit memory 84, 92 and then copies the data to the medium 91 after processing is completed. A variety of mechanisms are known for managing data movement between the medium 91 and the integrated circuit memory element 84, 92, and the invention is not limited thereto or to a particular memory system 84 or storage system 86.

Figure 6:
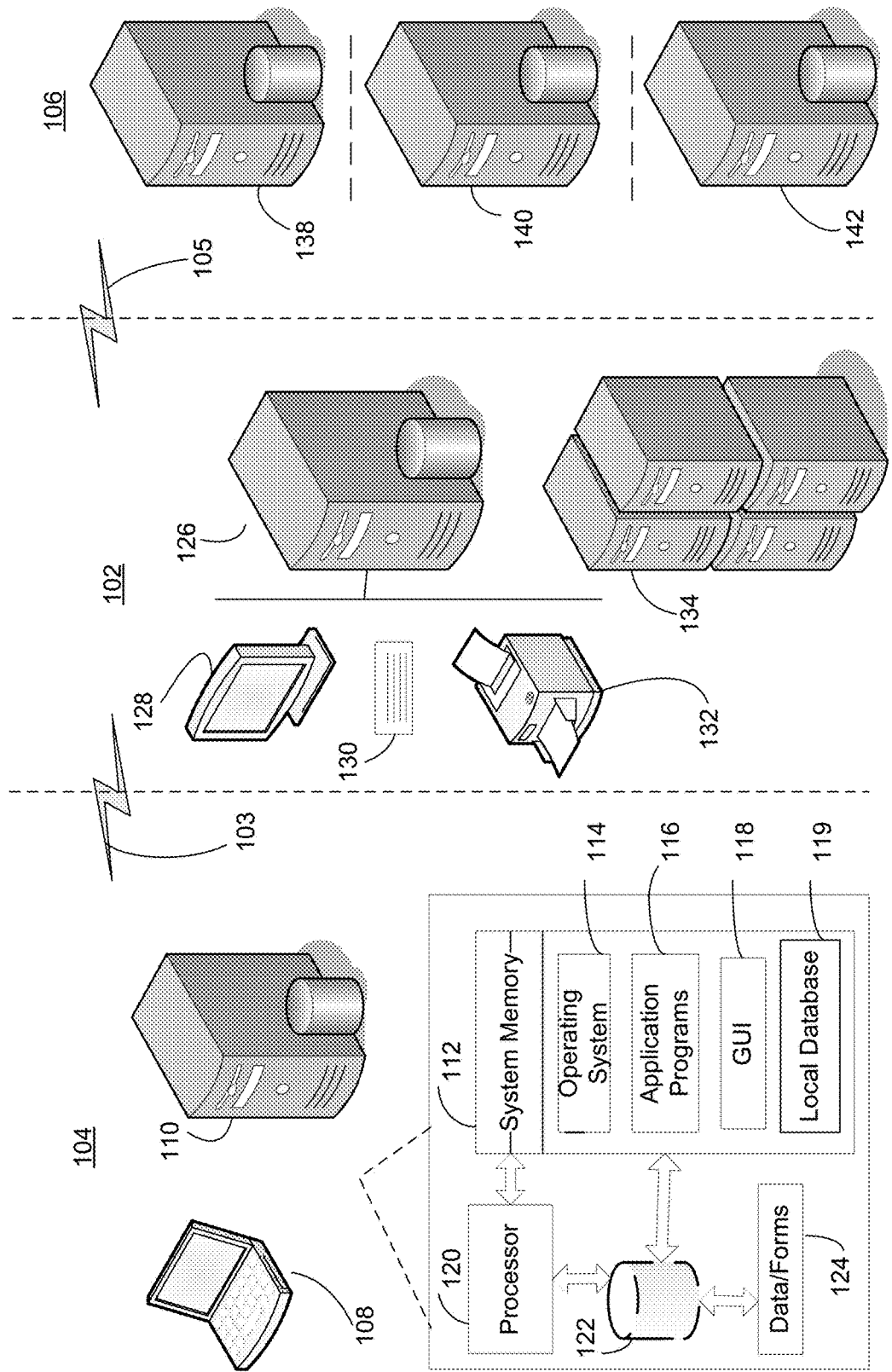
FIG. 6 is a schematic diagram of a first embodiment of the combination system of hardware and software components associated with the Enhanced Relationship Management system of the present invention.

Referring now to FIG. 6, a more particular embodiment of an Enterprise or Enhanced Relationship Management (ERM) system is shown comprising a network having a central facility 102 and a plurality of user workstations 104. The ERM may be connected via communication link 105 to various external resources 106 (138, 140, 142). In one exemplary embodiment, the user station 104 executes a client software application, or accesses the software via a communication 103. In this example, authorized users may be part of an organization, such as a law firm having a set of clients included in a network client database, with each lawyer having a subset of clients and contacts. The user station 104 may employ a mobile or local device, such as a wireless-enabled notebook computer 108 or network-connected desktop computer 110 or other suitable machine to connect to the central ERM 102 via communication link 103, such as the Internet, Ethernet, WLAN, WAN or other suitable network. User station ERM client provides, for example, a web-based, GUI-driven user interface for presenting professional services and relationship management data and processes. Station 104 may be part of a professional services firm or corporate-based network having software executing on a firm/company-based system. Alternatively, ERM may be a web-based system to which a company or firm has a license and to which its employees may connect for content delivery and other services. Communication links throughout the ERM may be a combination of wireless, LAN, WLAN, ISDN, X.25, DSL, and ATM type networks, for example. The computer 108/110 may comprise a typical combination of hardware and software including system memory 112, operating system 114, application programs 116, graphical user interface (GUI) 118, processor 120, and storage 122 which may contain electronic information 124. The operating system 114 shall be suitable for use with the practice management functionality described herein, for example, Microsoft Windows Vista (business, enterprise and ultimate editions), Windows 2000 with SP4 or Windows XP Professional with SP2. Also, the ERM client software may be browser-based and/or may include custom integration with Microsoft Office applications, e.g., Outlook, Word and Excel. Application programs 116 may include, for example, Microsoft Office 2007, Office XP with SP2, or Office 2003 with SP1 applications as well as professional services related software described above. The software and related data used to implement the ERM client processes may be accessed by the machine 108/110 via the Internet or it may be loaded onto the machine via CD-ROM or other media or a combination of such means.

For purposes of discussion, central ERM facility 102 may comprise a central server and database 126, user interface peripherals such as drives (not shown), monitor 128, keyboard 130, and printer 132, and one or more additional ERM support systems 134. The central server and database 126 may be used to communicate remotely, or locally for that matter, directly with client station 104 and may load, pass, receive information and instructions, such as software executable on the machine 108/110 and data for storing and using locally by user station 104. All or part of the necessary connections between systems 102, 104, and 106 may be Internet or (World Wide) WEB-based, Ethernet, wireless network, optical network or a combination and may be comprised of desktop-based, central server-based, or WEB-enabled or a combination. The computer systems used in implementing the various embodiment of the present invention may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Figure 4:
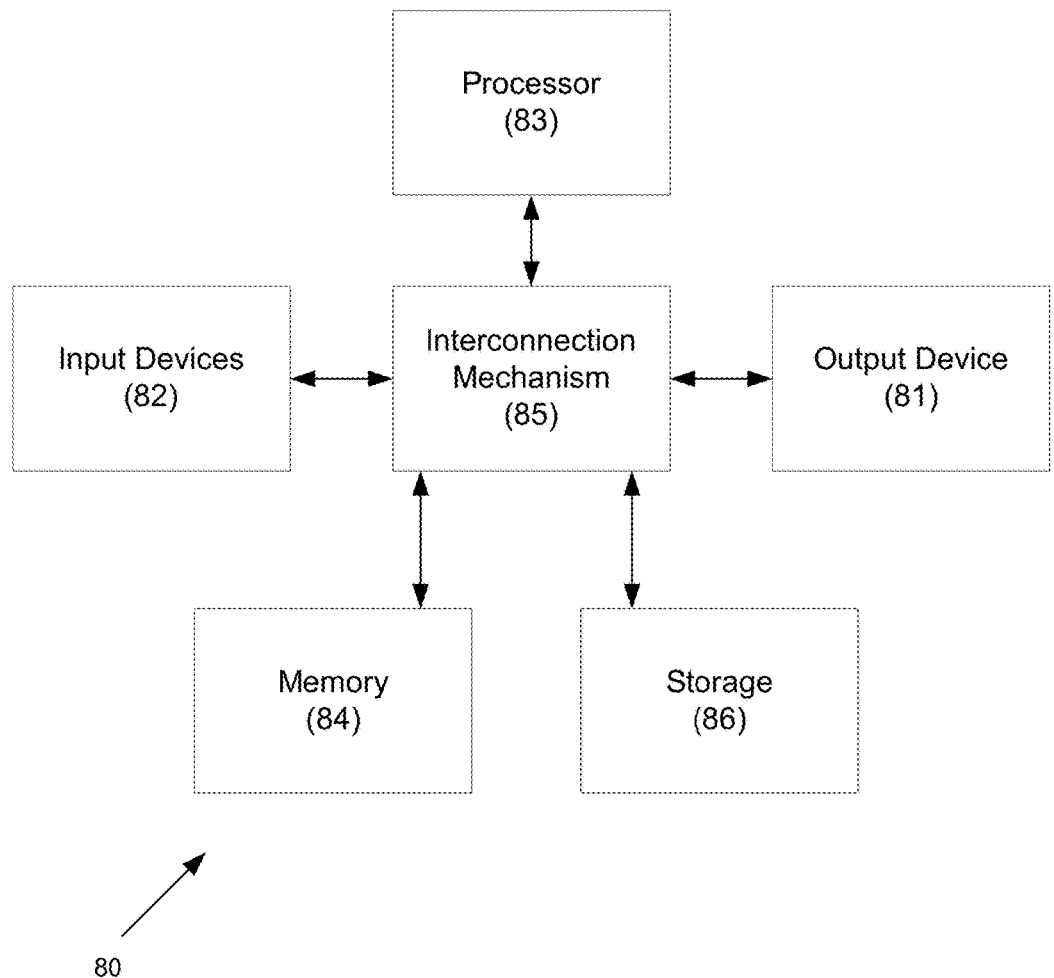
FIG. 4 is a block diagram of a computer system in which aspects of the invention may be embodied.

Although computer system 80 is shown by way of example as one type of computer system upon which various aspects of the invention may be practiced, it should be appreciated that aspects of the invention are not limited to being implemented on the computer systems shown in FIGS. 4 and 6. Various aspects of the invention may be practiced on one or more computers having a different architecture or components than those shown in FIGS. 4 and 6. Computer system 80 may be a general-purpose computer system that is programmable using a high-level computer programming language. Computer system 80 may be also implemented using specially programmed, special purpose hardware. In computer system 80, processor 83 is typically a commercially available processor such as the well-known Pentium class processor available from the Intel Corporation. Many other processors are available. Processor 83 includes multiple processor systems, particularly including the multi-processing systems. Processors usually execute an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, the open source Linux operating system or UNIX operating systems available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Aspects of the invention may be embodied in software operating on a general purpose computer or special purpose hardware, a special purpose hardware machine, or business methods, and instructions fixed in a machine-readable medium. The invention may also be embodied in a method of operating a computer, a computer network or other system as described above. Parts of the method may be performed by a customer and other parts by a service provider. Any suitable partitioning of the system or method may be used.

In one exemplary embodiment, the invention provides a computer-implemented method of maintaining a database of user profiles based, respectively, on user interaction with third-party systems and may be integrated for use with or for accessing an Enterprise (or Enhanced) Resource (or Relationship) Management (ERM) system or a Customer Resource Management (CRM) system. ERM as used herein refers generally to the management of relationship information from any or all of an organization's customers, suppliers, business partners and employees and may include sales force automation, supply chain management and other useful tools for the enterprise or concern. In one manner of operation the ERM accesses a unique user profile associated with a unique user. The ERM includes an agent software module executing on a processor that is adapted to collect, preferably automatically, data associated with the unique user. The agent collects the data based at least in part on the unique user's interaction with a system unassociated with the first system. For example, an unassociated application may be Microsoft Outlook. The agent evaluates the collected data and searches available databases to identify potential items of interest to the unique user based at least in part on the unique user profile and the collected data. The agent then determines a set of predicted items of interest to the unique user from the identified potential items of interest. For instance, based on the user's recent activities and strength of relationship scoring, the agent identifies articles and the like of greater interest than other potential items of interest. The ERM presents, e.g., a display associated with a client device, data representing the set of predicted items of interest. For example, the data may include articles identified as having person names and/or company names determined to match contact records associated with the unique user profile. For example, the ERM may prioritize information not just by a particular entity, but because of a number of additional factors like industry, location, prospect/client status of the organization, etc.

The data collected by the agent module associated with the unique user may further include accessing and searching user account data associated with the unique user. For instance, the user account data may include one or more of email, calendar, contacts, and phone record accounts. The user account data may include one or more of: an entry in a calendar program indicating a scheduled meeting with a first entity; a contact record representing the first entity; an email including an email address associated with the first entity; and an email containing a name or other identifier associated with the first entity; a billing system entry containing client, billing, time or related data; an ERM system entry containing contact, company, activity or related data; a phone call record; a travel system entry containing travel plans, reservations and related data; click stream data; and application usage data. The set of predicted items of interest to the unique user may include content concerning a first entity, the content being one or more of biography, article, caselaw, website, regulatory filing, financial reporting, transcripts, interviews, competitive intelligence, trading data, related analytics, third-party reports, and related internal data, such as ERM activities, experience data and related proposals. Moreover, the ERM may access and search data maintained within an organization and/or access database(s) outside of an organization associated with the unique user. The ERM may access one or more of: publicly available content database; subscriber-based content database; fee-based content database; professional service provider content database; government maintained database; and regulatory database, and may further include using secure sign-in data associated with the unique user to automatically access a database via a secure sign-in procedure, and still further wherein the secure sign-in data includes user login identifier and password data associated with the unique user. The method may further include using user profiles associated with one or more of professional and social networking sites (e.g., LinkedIn, Facebook, MySpace) to collect professional and/or personal data associated with the user or an entity linked to the user.

The ERM may determine based at least in part on the collected data a first entity, the set of predicted items of interest being related to the first entity. The ERM may evaluate the strength of relationship between the first entity and the unique user. The collected data may include contact information associated with the first entity, unique user information and one or more values related to strength of relationship between the first entity and the unique user. The ERM may compare the first entity with an authority database to validate the identity of the first entity; compare the first entity with one or more databases to determine a confidence level used to associate the first entity with a known entity; perform a disambiguation process on the first entity to validate the identity of the first entity; perform a data cleansing, to eliminate false positive identification of entities, such as separating spam mail from real emails; perform one or more of Bayesian, idf, and TF-idf, processes on the identified potential items of interest; perform, in a network-wide context, analysis of entities extracted from the item (for example, prioritizing information not just by a particular entity, but based on additional factors like industry, location, prospect/client status of the organization, etc.); present links to one or more of document, webpage, database; automatically generate and transmit an email to an email account associated with the unique user; automatically incorporate into a calendar event associated with the unique user a set of one or more links to one or more of the predicted items of interest; automatically generate and present via a user dashboard associated with the unique user links to one or more of the predicted items of interest; present the unique user with a user interface adapted to enable the unique user to dynamically select and/or deselect certain ones of the predicted items of interest. Also, based on the unique user taking an action related to the predicted items of interest, the ERM may collect data associated with the user action and update the user profile based on the collected data associated with the user action. The ERM may perform in either a periodic or a real-time manner. The ERM may build a user profile via algorithms to segment and rank the areas of interest to a given user; modify the user profile based on user's reactions to the presented data; identify similar user profiles as a potential additional source of predicted items of interest, based on users' reactions to presented data; access by a first external provider system a first user profile maintained by the database; receive data derived from a first external provider system and concerning an entity associated with a first user profile maintained by the database; revise the first user profile based on the data received from the first external provider system.

The ERM is a computer-based system adapted to maintain a database of user profiles based, respectively, on user interaction with third-party systems. The ERM comprises: a server comprising a processor and a memory adapted to store executable program instructions and data; a database comprising a plurality of user profiles; and an agent module. Each user profile is unique and associated with a unique user entity representing a known individual. For instance, the ERM may include or have access to an authority database comprising a relevant population of known individuals, e.g., practicing attorneys. The server is adapted to access the database and to receive inputs. The agent module includes a first set of code executable by the processor and adapted to process data associated with the unique user based at least in part on the unique user's interaction with an unassociated system. A second set of executable code is adapted to evaluate collected data and search available databases to identify potential items of interest to the unique user based at least in part on the unique user profile and the collected data. A third set of executable code is adapted to determine a set of predicted items of interest to the unique user from the identified potential items of interest. A fourth set of executable code is adapted to present at a display associated with the unique user data representing the set of predicted items of interest. In one manner of distribution, the ERM may include code that is stored on a computer-readable medium.

In one manner the ERM includes code adapted to access by a first external provider system a first user profile maintained by the database; and/or means for receiving data derived from a first external provider system and concerning an entity associated with a first user profile maintained by the database. The system may be adapted to revise the first user profile based on the data received from the first external provider system.

One problem in today's professional relationship management is that professionals, e.g., lawyers, bankers, etc., have too much data from too many sources to process and too little time to make efficient use of the data. The data is typically organized (if at all) at the individual level and is not effectively integrated and leveraged across a firm. The key is to collect, process and deliver the right type and amount of information (the "Intelligent Information") at the right time for the most efficient use and benefit of the data available from the many sources. The ERM system of the present invention delivers this Intelligent Information. For example, a professional user is meeting in two weeks with a key client. ERM is aware of that information and delivers relevant content (or links to content) concerning the meeting (date, time, attendee(s), company affiliation, subject of the meeting, etc.) such as news (breaking or recent articles) concerning the attendee or the subject of the meeting (e.g., litigation, acquisition, earnings reports, mergers, etc.), transcripts, analysis, biographical information, and other relevant information to the individual in the format most desired and effective to enhance preparation and success. ERM supports building and maintaining relationships with key clients (individuals and corporate entities).

In another example, a user may be planning a trip to London to visit a potential partner. ERM on a preferably continuous basis is aware of the trip (e.g., through continual interrogation of calendaring systems) and provides the user with helpful background information, as well as information concerning the destination. The ERM may be aware of other potential or existing clients in the destination city or country and may suggest additional meetings to arrange and present colleagues within the firm who have contacts (relationships) at the target client or at least at the location. For example, ERM may interrogate a firm-wide contacts database and be aware of an existing client of a colleague in the same or different office of the user. The colleague may be in the same or a different professional service area (e.g., litigation, corporate, securities, M&A, intellectual property, accounting, consulting, tax, etc.) than the user. ERM may then present to the user information concerning the existing or potential client, including the name and contact information for the colleague(s) and a summary of work performed for the existing client or work performed in the past for a potential client. ERM may also access available databases to identify persons, such as contacts of the user or contacts of colleagues of the user or persons formerly associated with the firm that are now in-house or otherwise associated with a potential client. ERM anticipates the meeting date and preferably provides the enhanced information some time in advance of the meeting or trip and may update the report or focus on certain aspects of the report based on direct or indirect user inputs or feedback. In this manner, ERM is acting as an agent or a dedicated "assistant" that continuously seeks to deliver the most relevant information at the most desired time. ERM builds and maintains a continuously evolving user profile based on, for example, the following criteria: people the user is engaged with; the companies those contacts work for; what ERM or accessible databases and sources knows of those contacts and companies; when the user is meeting with those companies and contacts; where the user is meeting with the client/contact; the user's biographical profile (education, role, title, areas of interest, etc); the user's employer profile (industry, size, geography, etc); the user's interest, or lack of interest, in prior information delivery. One avenue of delivery is "Intelligent News Feeds" that are based on an awareness of the individual user via the user profile associated with that user. Intelligent Information may bring, for example, lawyers breaking events on their strongest relationships, wrapped with key contextual data on the companies (intelligence, analysis, billings, etc.) and the ability to view related details (dockets, etc.). This may be done for example over the Internet or over an Intranet (e.g., SharePoint) and via mobile devices (e.g., mobile phones, PDAs, iPad, and other mobile computing devices). ERM provides a user profile service that may be embedded in a professional service/content provider application, solution or data stream. For example, Thomson Reuters has numerous applications, solutions and feeds or data streams that may be integrated for delivery.

The user profile may be maintained by the client system, e.g., a law firm, but is preferably a centrally maintained record accessible by an enterprise through a client device. The user profile is designed to reflect all (or at least the most relevant) data known about a given user. For example, the profile is aware of user activities and data in Enterprise Systems, such as email, calendar, CRM activities, phone call logs, travel plans, application usage, etc. The profile may also be aware of other user profiles maintained by third party providers, such as a Facebook, LinkedIn, etc. ERM may make the user profile dynamic and available, at least in part, to other data and solution providers, in exchange for information to further enhance the integrity and robustness of the profile. In this manner, the user profile may become the authority and preferred source of the comprehensive information concerning the user. The user profile may allow for customization of information and delivery to professional users.

Figure 7:
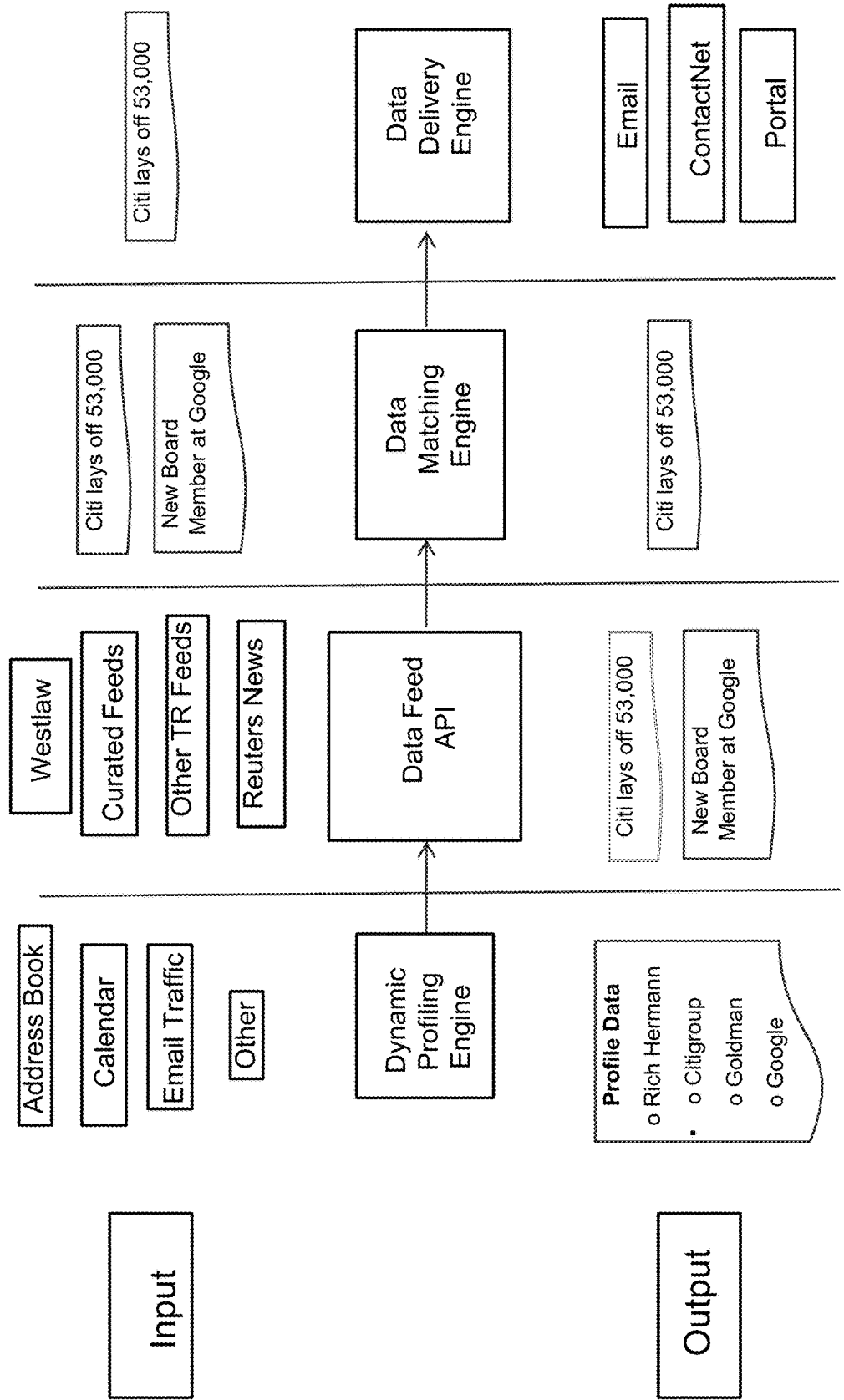
FIG. 7 is a data flow architecture illustrating an exemplary ERM data flow.

With respect to FIG. 7, a dataflow architecture is shown illustrating an exemplary ERM data flow in which inputs of various types are shown in the upper portion of the figure and outputs of the ERM are shown in the lower portion of the figure. The intermediate processes performed by the ERM are shown between the inputs and the outputs. One type of user inputs relates to systems such as email, calendaring, contacts/address book, and tasks applications (e.g., Microsoft Outlook). A Dynamic Profiling Engine (DPE) is a process performed by executable code stored and operating on a memory and processor associated with the ERM. For instance, the DPE may interrogate the contacts, email and calendar entries of a system, such as a professional firm or corporate entity, to associate perceived individuals (e.g., employees or partners or associates with the firm/entity) respectively with a unique user profile. For instance, the DPE identifies a user having an Outlook account and dynamically creates a unique user profile associated with this person/account. In this example, the DPE identifies an Outlook account for an individual "Rich Hermann" and dynamically creates a unique profile for this perceived individual. The unique Profile Data record as shown for "Rich Hermann" has an association or "relationship" with the company entities "Citigroup, Goldman, and Google." For instance the user profile data record may include employer and past employer fields.

The next type of ERM inputs relate to content/resource providers such as those provided by professional services providers, e.g., Thomson Reuters, that serve one or more professional services industries, e.g., legal, medical, accounting, educational, financial. Examples of content/ services from such providers includes curated feeds, news feeds, and other data feeds. In this example the Data Feed API (Application Programming Interface) ("DFA") of the ERM processes, either directly or through other agents/sub-agents, these inputs to yield a set of responsive records or articles (e.g., "Citigroup lays off 53,000" and "New Board Member at Google") determined to be of potential interest to the user/profile "Rich Hermann." The ERM then performs a matching process by way of Data Matching Engine ("DME") to determine or predict, based on the user profile, a subset of articles or information likely to be of particular interest to the user "Rich Hermann." As described herein, the ERM includes processes to make a higher level "match" of information to the user. In this example, the DME determined that only the article "Citi lays off 53,000" was of particular interest to the user. In the final step, the Data Delivery Engine ("DDE") of the ERM processes the set of items of particular interest (here the single article) for delivery to the user. In this example the set of items of particular interest may be delivered by one or more of email, ContactNet (ERM client/portal/dashboard) or other portal.

In a variation of the data flow operation of FIG. 7, the DPE process has already been performed as described above and has created a user profile for the user. In maintaining or updating the user profile and in determining whether there are any new articles or content of interest to the user, the ERM re-interrogates the contacts, email and calendar entries of a user and uses a protocol designed to identify and rank potential items of interest associated with a user and more directly, a unique user profile associated with the user. For example, the DPE may identify a calendar entry for an upcoming meeting of the user "Rich Hermann" with an individual "John Doe" and further identify the entry as related to one or more of a contact entry of the user "Rich Hermann." For instance an email with an address or personal identifier for a "John Doe" or some identifying bit of information, e.g., an email address jdoe@company.com that matches for example a user contact entry. The ERM may recognize the "John Doe" of the calendar entry as a particular "John Doe" associated as an employee of a particular company based on interrogation of the contact entry and other sources of information, e.g., past meetings with John Doe, emails to/from John Doe, emails having contents with the string "John Doe" or email address for "John Doe" etc., LinkedIn, Facebook, other external resources. The ERM may then invoke content/resource providers data feeds using DFA to yield a responsive set of records determined to be of potential interest to the user Rich Hermann and related to the particular "John Doe" recognized. The DME then further processes this results set to yield a set of items of particular interest related to John Doe for delivery by the DDE to an account (e.g., email, ERM or other portal) associated with the user/profile "Rich Hermann."

Figure 8:
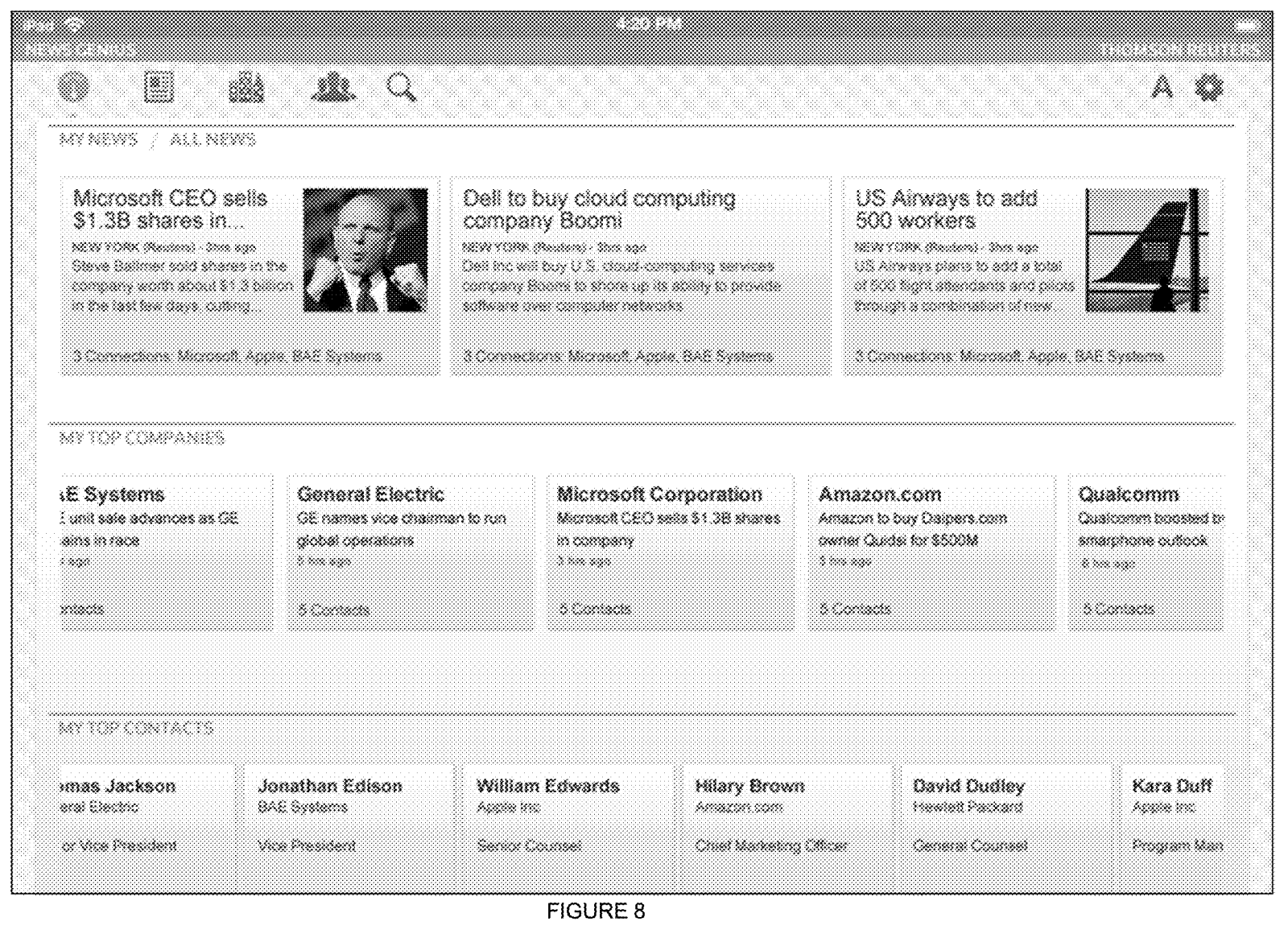

As shown in FIG. 8, the user interface ("UI") associated with a user profile allows the user to more easily see the intersection of a feature referred to as "My News", which includes breaking news on relevant companies or clients, a feature referred to as "My Top Companies", which includes news on the user's most active relationships, and a feature referred to as "My Top Contacts", which concerns how the user can act on the news delivered. Additional features may include "My Upcoming Appointments". This UI may be used to deliver content and data of a given provider or set of providers (e.g., Thomson Reuters) on one or more given companies of interest, see for example the screen shot of FIG. 9. In this manner ERM provides not only "Intelligent" data but also the UI serves as the entry point for a customized delivery of service/content provider data and services (e.g., Thomson Reuters Financial Markets data, Eikon, Westlaw, etc.)

Figure 9:
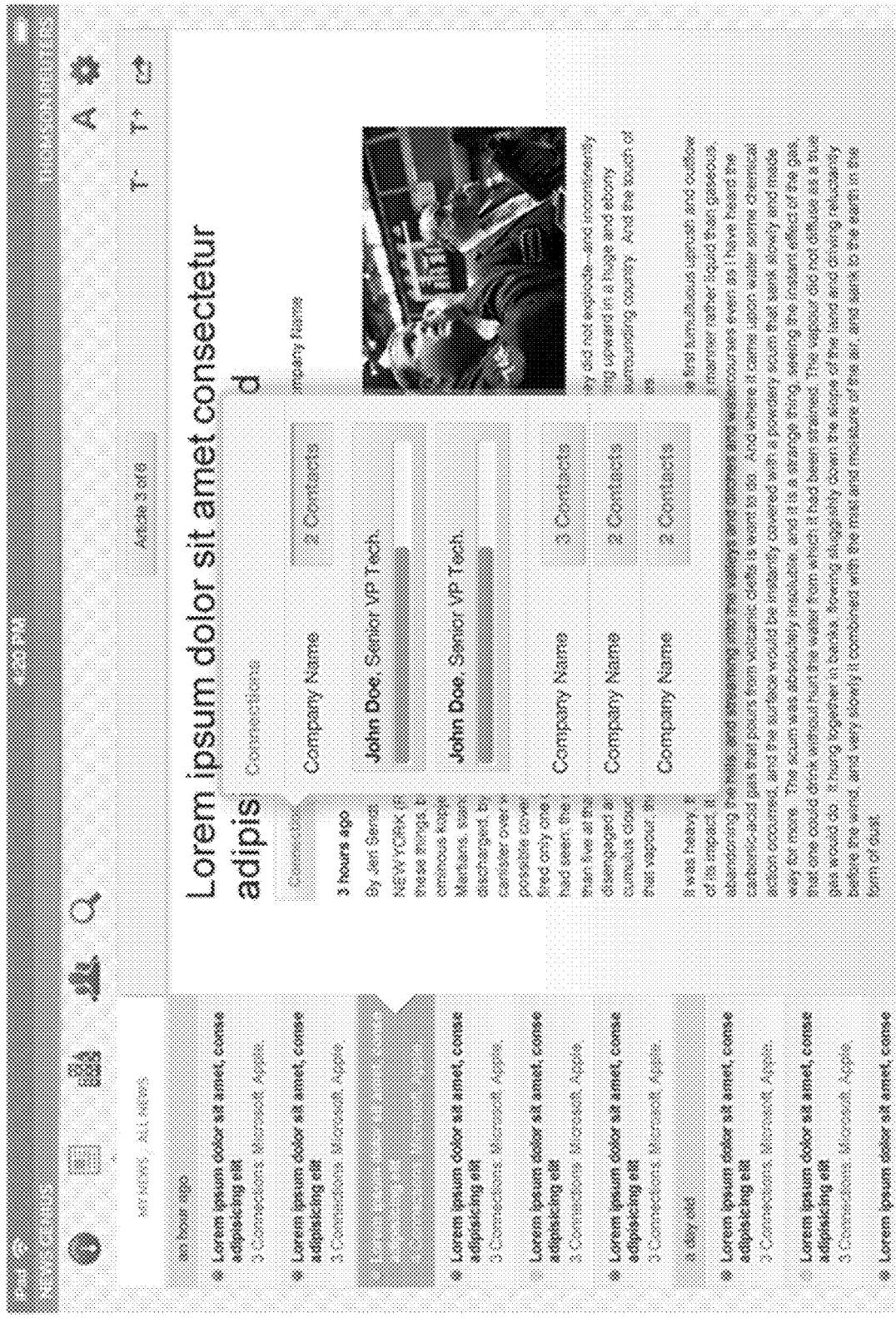
FIG. 9 is an exemplary screen shot of an ERM UI which delivers an article of interest to the user and presents contact information relating to the article.

In the example of FIG. 9, the UI of the ERM delivers an article of interest and shows a set of "Connections" consisting of four "Company Name" entries. One of the "Company Name" entries has been engaged to show two contacts with that company, "John Doe, Senior VP Tech." The user can then select from the presented set of contacts related to the article to obtain additional information or to start the process of contacting the individual such as by email. For instance, if the ERM delivers an article of interest about an upcoming merger involving an existing client of the user, then the user may desire as a way to maintain the relationship with the client to send an email concerning the upcoming merger. For that matter the user may inquire directly about any services that may be rendered in connection with the merger. If the article selected and delivered by the ERM relates to a new lawsuit filed against an existing client or person with which the user has an established relationship then the user may contact the individual concerning representation in connection with the lawsuit or with providing accounting, financial or other services related to the delivered content.

Figure 10:
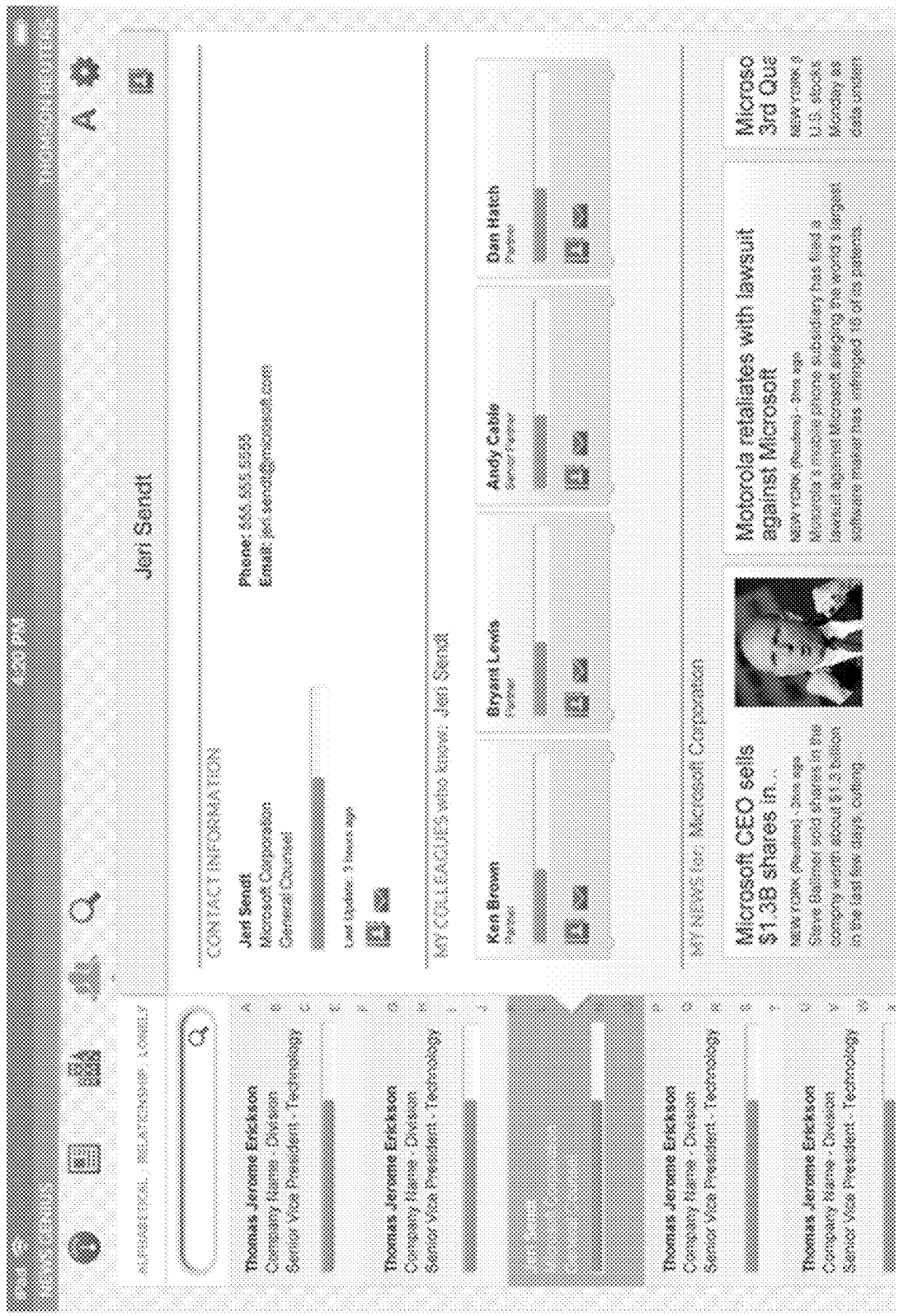
FIG. 10 is an exemplary screen shot of the UI of the ERM showing a set of contacts associated with a corporation.
Figure 11:
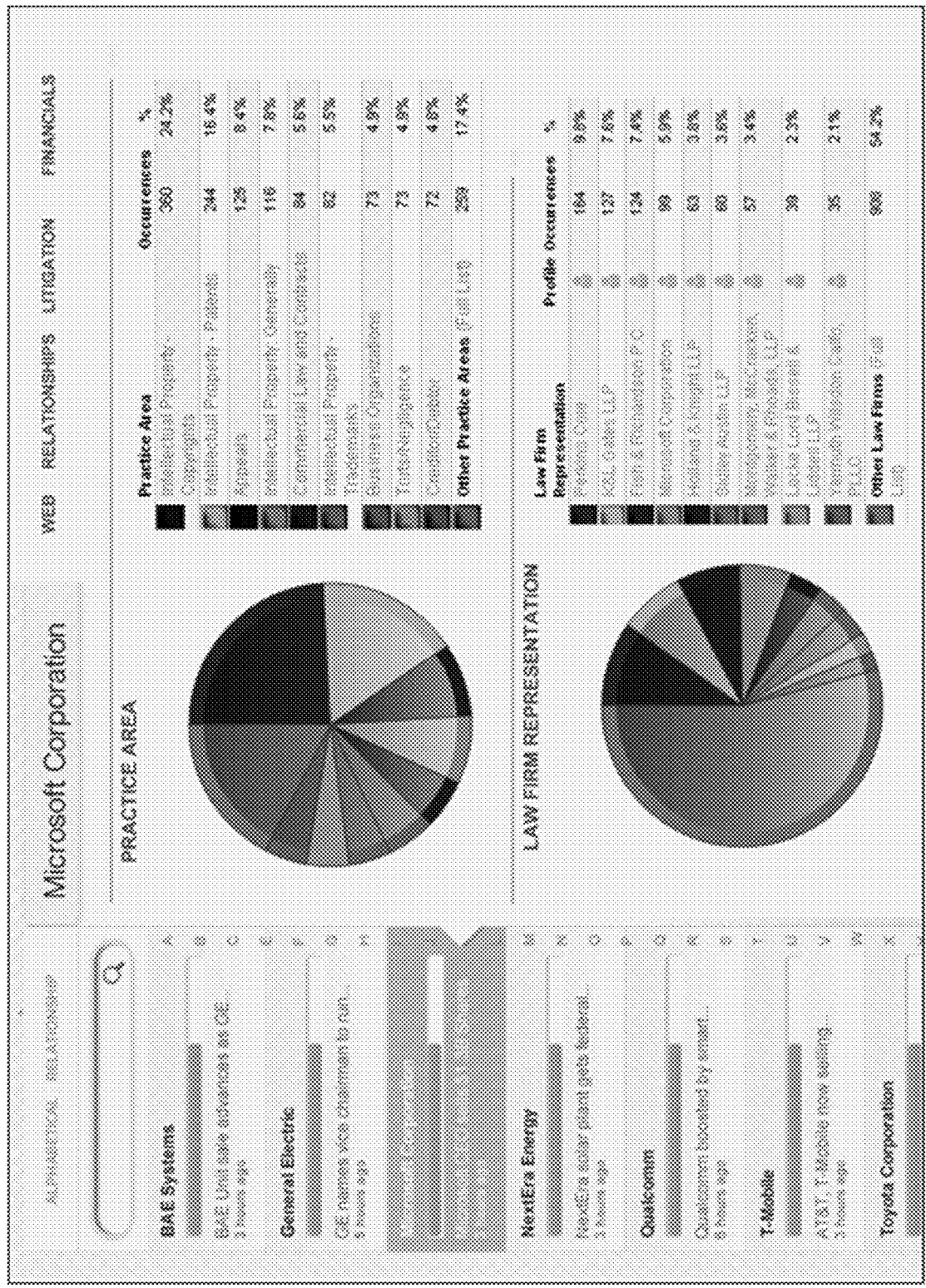
FIG. 11 is an exemplary screen shot of the UI of the ERM which represents a graphical depiction of the relationship the user's firm has with the organization of FIG. 10.
Figure 12:
FIG. 12 is an exemplary screen shot of the UI of the ERM which presents Financials associated with the organization of FIG. 10.
Figure 13:
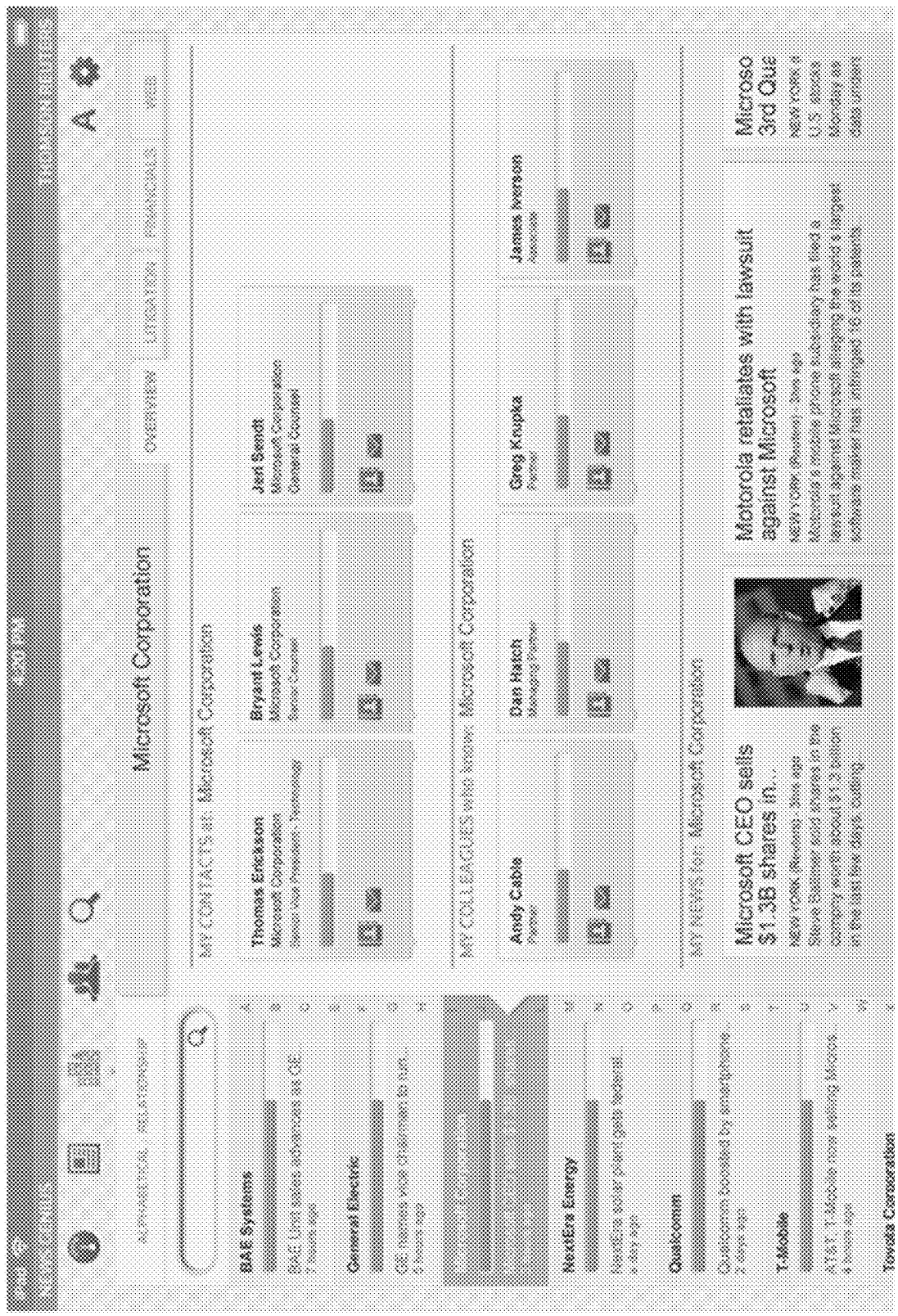
FIG. 13 is an exemplary screen shot of the UI of the ERM having on the left panel a "contacts" access interface.

FIG. 10 shows a UI having a set of contacts associated with the corporation "Microsoft Corporation" that include Thomas Erickson, Bryant Lewis, and Jeri Sendt. The UI further identifies colleagues of the user, e.g., other partners or associates at a law firm, that have contacts with the company, e.g., Andy Cable, partner; Dan Hatch, Managing Partner, Greg Krupka, Partner; and James Iverson. From this UI the user may invoke email or ERM icon to connect with the individuals appearing on the screen. A bar graph is shown that may serve to illustrate a relative level of connection with each individual presented, such as based on the number of times email was exchanged with the person over the past set amount of time. This may be a parameter maintained by the ERM in the background such that the level is adjusted over time and pre-assigned to the individual contact and associated with the user profile. On the left panel of the screen shot are articles identified by the ERM and delivered to the user as items of particular interest. The user may selectively click on the articles for review and further contacts associated with those articles may be presented in the manner discussed above. FIG. 11 represents a graphical depiction of the relationship the user's firm has with the client company, in this case Microsoft Corporation. The graphs breaks down by practice area and representation the nature of legal services provided to the client in the past. Additional tabs for "Relationships", "Financials", and "Web" are provided to allow the user to select additional types of information for review. For instance, at FIG. 12 the UI of the ERM presents Financials associated with the client/company—Microsoft Corporation. FIG. 13 shows an exemplary screen shot of the UI having on the left panel a "contacts" access as well as a personalized "MyNews" region of the UI. In this example the user's contact for "Jeri Sendt" is shown and the ERM identifies other colleagues that have a relationship/connection with Jeri Sendt. The user may wish to reach out to one or more of the colleagues to learn more about the individual, Jeri Sendt, or to determine a preferred way to approach the client/individual. Also, the user may not have a contact at the company at all and the ERM provides a way for the user to find a colleague who does have an existing relationship that may be leveraged for the benefit of the organization.

Figure 14:
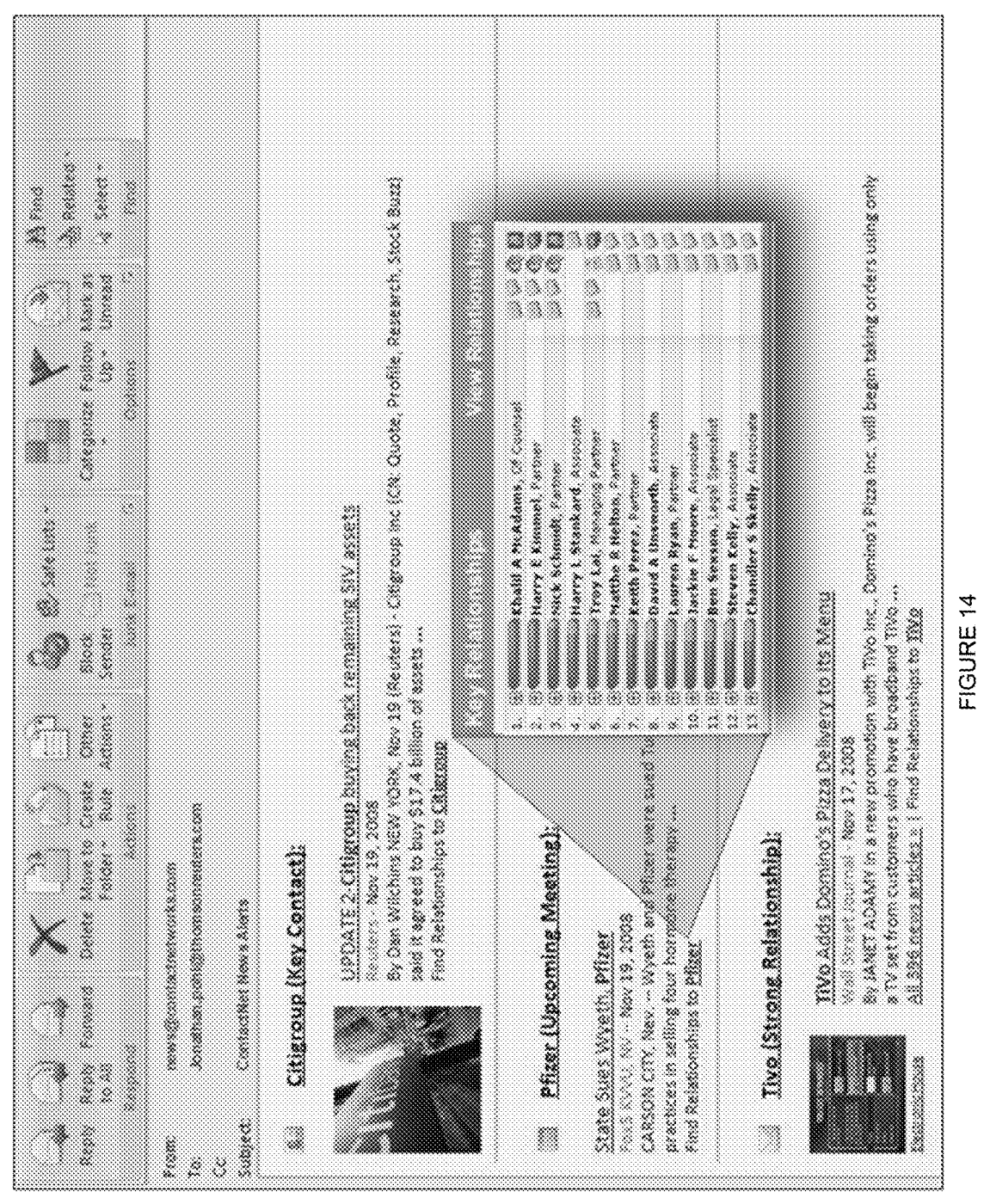

With reference to FIG. 14, the ERM provides personalized news summaries that help users stay on top of key clients, prepare for upcoming meetings and maintain strong relationships. The content may be delivered in any number of ways, including personalized enterprise portals, and embedded in information services such as Westlaw or Eikon. In this example, after identifying content of interest to the user (Jonathan.pohl@thomsonreuters.com) the ERM generates an email to deliver the content of interest or links or other paths. In this example a key contact at Citigroup is shown as having an update article relating to "Citigroup buying back remaining SIV assets." In this example, there are three types of updates, one related to a key contact, one related to an upcoming meeting (Pfizer), and a strong relationship (Tivo) having a recent article naming the company.

In another example, an attorney, e.g., Barbara Jones, a member of law firm "Firm" sends a calendar invite to client Jim Smith, the General Counsel ("GC") of company "Client" to meet in two weeks. Attorney Jones then books a flight to San Francisco, Calif. ERM includes software that interrogates systems on an on-going basis to become "aware" that Client is a top client of Barbara and Firm. The ERM also is aware that Barbara's last meeting with Jim Smith was, for example, six months ago. ERM may also be aware of the most recent contact, meeting, email or other event that other members of Firm have had with either Jim Smith or with other people associated with Client.

In one embodiment ERM prepares a "meeting preparation pack" that includes, for example: recent articles, patent filings; competitive developments, monitor market share analysis; recent billings and work done; recent contact with Client. ERM then delivers the meeting preparation pack to Barbara such as via an Intranet/SharePoint or mobile via network communication, mobile phone, iPad or the like. ERM recalculates key relationships and the associated user profile on an ongoing basis, for example on a daily basis. For example, ERM may update the following aspects of the user profile: People and Companies on upcoming calendar appointments; key relationships to companies and people; and new relationships. The ERM aggregates, filters, indexes, and scores relationship profiles in order to understand key relationships for each user at current time. ERM accepts relationship information from data sources implementing the Relationship Profile API. The ERM's Data Matching Engine (DME) accepts lists of key relationships (people, companies) for each user from the Dynamic Profiling Engine. For each key person and company, DME queries each data feed (via Data Feed API) for relevant news/data.

Query generally done by passing in company name or person name and if pre-matching has been done, the process passes in native identifier to data feed (e.g., WCA ID).

The DME performs additional filtering to select most relevant data output, aggregates results and sends results to Data Delivery Engine. Data Feed API provides a consistent interface for Data Matching Engine to perform searches and extract data for matching/filtering against user profiles. DFA may be, for example, implemented as a simple XML/HTTP API for each data source. Data preferably accepts URL Search Parameters, company name or ID, person name or ID. The Data Feed returns matching data items in API return format, e.g., metadata (name, ID, type), content, text, URLs, Document IDs. The ERM receives profile-matched data output from Data Matching Engine and can push data as available, or serve data on-demand (pull). The ERM may push data via Data Delivery API. For instance, Data Delivery Adapters implement the API. A Data Delivery Adapter receives data from the DDE when available and pushes it out to end user (e.g., direct to Email, IM, SMS, or another service which formats and then sends out to Email). Data Delivery Engine can be configured to send output to Data Delivery Adapters on a schedule, or as soon as it is available. Client Applications can pull data from Data Delivery Engine, e.g., may pull available data on demand via Data Delivery API, for example, for providing contextual links/ info in a web application. For instance, data output format may be similar to Data Feed API input format. The ERM may allow clients to selectively decide what kind of personalized information should be delivered and where in the application. The ERM may include Data Feed Adapters for any application-specific data sources that should be mined and may allow clients to configure any existing Data Feeds desired for use. The ERM may include Data Delivery Adapters to control how personalized information is delivered to a client's users, e.g., pull adapter that serves data into a website sidebar, and a push adapter that receives updates, formats and brands the data, and sends it off via email.

The invention delivers a more personalized, relevant stream of data, i.e. "Intelligent Information," to a given user via desktop and mobile environments. The system may be integrated into a platform to create personalization profiles for each user. The unique profile record may include data from a variety of sources and types, such as: companies and contacts that are most relevant to the user; upcoming meetings such as identified from calendaring and other applications such as Microsoft Outlook; upcoming travel plans; usage of professional support software applications and services, e.g., Eikon and Westlaw, that may be across mobile and web environments; a user's stated preferences, such as topics, watch lists and "thumbs up/thumbs down"; and user title, role and focus, based on integration with Active Directory. Active Directory is a directory service from Microsoft Corporation, similar in concept to Novell Netware Directory Services, that integrates with a user organization's DNS structure and is interoperable with LDAP (a protocol for accessing on-line directory services). The system may manually, periodically or automatically/continually update user profile records to reflect changes, such as changes to the user's Outlook calendar account, the user's or ERM's contacts records/database.

Figure 15:
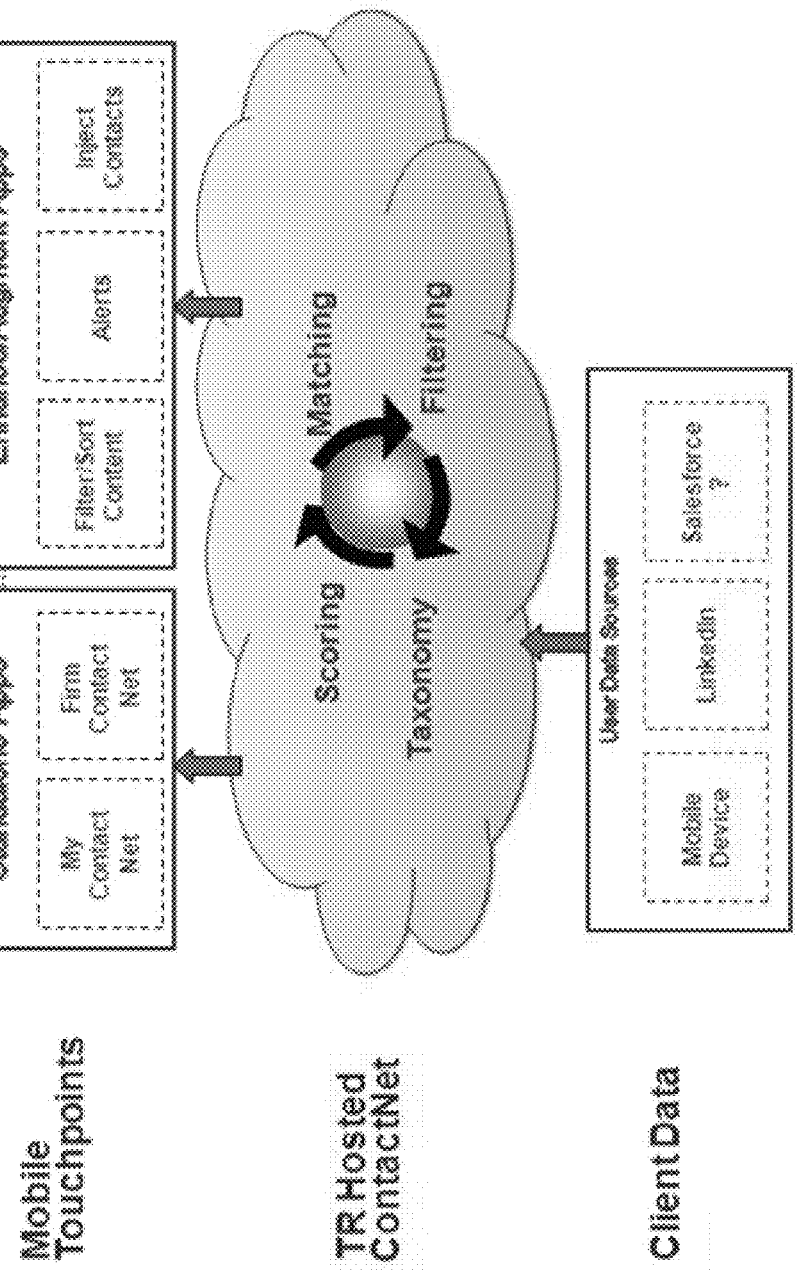
FIG. 15 shows the ERM implemented in a cloud environment.

With respect to FIG. 15, the ERM may be implemented in a cloud environment, to make it available to individual users via mobile devices or Outlook plug-in for an Intelligent News Pro, for example, without needing professionals/firms to involve IT. The user interface (UI) of the ERM may be deployed in, for instance, either PC or Apple oriented operating systems and environments. For example, the UI may be configured using UI elements that conform to Apple's Human Interface Guidelines (HIG). Users are typically presented with a login dialog where they can input a username and password to login to the application and access related data. For example, the user may use their Windows credentials, which will be authenticated using the ERM Web Service. The login dialog may also give users the option of setting up the application to automatically log them in. By default, users will need to be able to connect to the ERM Web Service to authenticate. The base URL for the ERM Web Service needs to be established before a user can login to the application. Paths may vary across client systems. If users connect to the ERM Web Service using a VPN connection, and thus accessing an internal URL, client systems may setup standard aliases for accessing the ERM Web Service. Rather than presenting users with a partial or complete list of ERM clients, the system may create a unique access code for each client. Users would then be given the access codes which could be used to lookup the appropriate URL. In one embodiment, the ERM may use the SSL VPN support in Apple iOS 4.2 to connect to ERM content. The ERM may be set up to accommodate and support other security methods and secure web services. The ERM may leverage the expanded SSL VPN support in iOS 4.2 to provide clients with the option of keeping application data behind their firm's firewall. If a secure connection isn't established, the system displays a message to the user on the Login screen letting them know that the application is in offline mode. Any relationship data stored on local devices should be encrypted to ensure that the data is protected should the device be compromised. The system may utilize the data protection APIs available in iOS 4.2 as a method for ensuring data security.

In one example of using the ERM in a cloud environment, the targeted users may be the large population of professionals who leverage news, data and relationships to growth their businesses, e.g., lawyers, accountants, consultants, advisors, sales people, etc. The system may include a NewsModule for automatically identifying, collecting and presenting information believed to be of interest to a user of the system based on a user profile record. In this manner, the ERM leverages the user profile data to intelligently anticipate information the user will find of interest and helpful in their business pursuits. In operation, a user downloads the NewsModule or a client application associated with the NewsModule either as a mobile application or a plug-in to an email client (e.g., Gist). The NewsModule builds a foundational set of relationships based on the users address book, email and third party networks and professional and social media preferences (e.g., LinkedIn, Facebook). The NewsModule then further refines the user profile based on user-selected preferences and/or user activities (e.g., articles selected, forwarded, etc), and any explicit feedback ("likes/ dislikes"). The NewsModule then builds a profile of the individual's network, based on open rates and any explicit profiling, submitted either by the user or the recipient. Profiles may be further enhanced based on analysis of content in messages.

Figure 16:
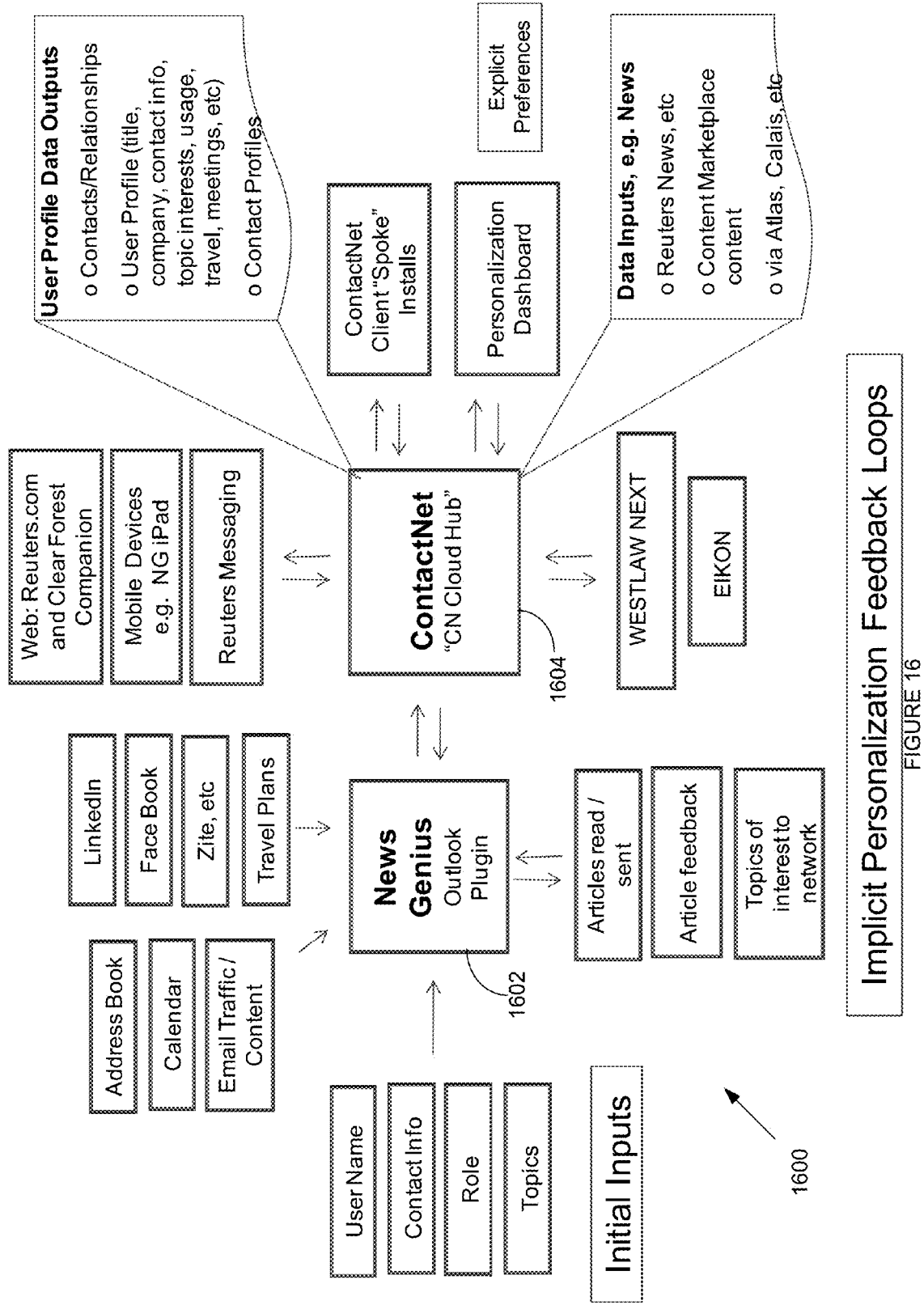
FIG. 16 shows implicit personalization feedback loops associated with ERM dataflow.

With reference to FIG. 16, ERM 1600 includes a NewsModule 1602 in two-way communication with a "ContactNet" Cloud Hub 1604 to provide a personalization and relationship management and feedback system. Both NewsModule 1602 and Cloud Hub 1604 may access various internal components of the ERM and may access various outside resources and third-party system to identify and collect information of interest to a user and to update a user profile record. For example, the NewsModule may monitor articles read or sent by the user, such as by monitoring email activity in Outlook or by monitoring Internet browser activity. A user may input information or the NewsModule 1602 may otherwise access information pertaining to the user, e.g., via Active Directory, user information including user name, contact information, role, job title, education, past employment, locations of residence(s), department, subordinates, supervisor, topics of interest, etc. A user may input or select as topics of interest news articles about contacts in the user's contact list, news about topics of interest associated with contacts in the list, news about companies covered or included in contacts list, news about industry covered and other news of interest.

As discussed above the NewsModule may access the user's address book, calendar and email traffic (optionally including content) as maintained by the organization ERM. By monitoring user activity and account data the ERM can detect a new or upcoming appointment of the user with a client or other person of interest and can automatically and periodically access internal and external sources to identify and collect and/or present information of interest concerning the upcoming appointment, e.g., the client, the client's firm, a litigation concerning the client, etc. For instance, the ERM may access publicly available news services and identify an article in which the client is mentioned or the client's firm is mentioned and it may present to the user a link to the article or a copy of the article. Also, the ERM may access a subscription or pay-for service (e.g., Westlaw, Eikon) and, by accessing the user profile record and automatically using the user's authorized login username and password, access content of interest related to the upcoming meeting. In another example, if the client's company was recently the subject of a press release announcing an upcoming acquisition the ERM may identify that press release and pass along a link to the user in advance of the meeting date. For instance, the ERM may include a "dashboard" running on the user workstation to prompt the user as items of interest are identified. A user interface associated with the dashboard, among other things, may allow the user to set, revise or override user preferences, access content, access internal or external resources, revise user profile, and revise (user/network) contact information.

The ERM "knows" of the date of user meetings based on an "awareness" of the user's calendar. The user may selectively setup his/her ERM client or profile to request delivery of relevant information at a set time, e.g., two days, in advance of calendared meetings. The ERM may present the user with a list of identified potential items of interest from which the user may select certain ones for review. The ERM may "learn" from the user's selections and further refine its processes for automatically identifying and collecting information of interest. The ERM may also update the user profile record to reflect preferences and activities that intuit preferred resources and the like. In addition, the ERM may access other resources such as social and professional network sites—LinkedIn, Twitter, FaceBook, Zite, Travel Plans, etc. From these resources, as well as from articles, etc., the ERM may learn about the user's client contacts and may update user/network contact records associated with such individuals and associated companies. For instance, if the ERM detects that a person identified as a client of a user has changed positions within a company or changed firms then the ERM may present the user with the potentially relevant event and the user may then selectively determine to update the client contact to reflect the job change. The ERM may utilize various messaging platforms to present information to the user. The ERM may include mobile applications to effectively communicate with users using various mobile devices.

Figure 17:
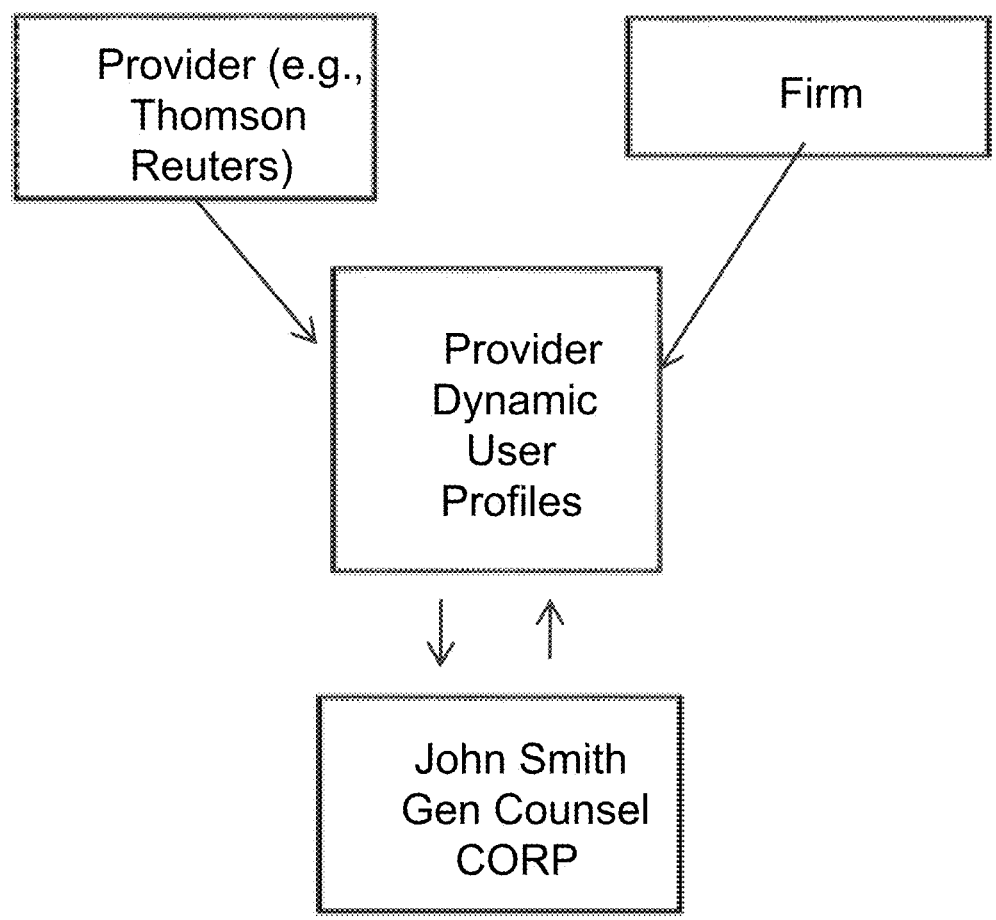
FIG. 17 shows a block diagram of a central authority provider maintaining a database of dynamic user profiles.

With reference to FIG. 17, in one embodiment the invention provides a centralized "authority" database of user profiles that includes an ERM function. The authority profiles (Dynamic User Profiles) may include a set of professional profiles that are maintained for the benefit of the user organization or for the benefit of the user individually. In one manner, the user, upon leaving an employer/organization, may retain ownership or control over the user's individual profile. In another manner, the user profile may be "owned" or controlled by the organization and unavailable to the user upon leaving the organization. In either manner, a central provider can act as a clearinghouse for authoritative information on professionals throughout the careers of the subject users. Further, the central authority may maintain a list of contacts associated with and accessible by the user. The user also may or may not retain "ownership" of the user contacts upon leaving the organization.

This authority user profile service may be for a fee or otherwise be based on subscription or other commercial basis. In addition, professional organizations, such as local or national bar organizations, may directly or indirectly serve as the guardians of the user profile database of information. The authority profile may then be incorporated for use internally with an organization associated with each particular user, for instance the current employer of the user/professional. In one manner, the user may opt to allow the central authority to grant access to the user's profile without restriction or to a selected set of entities. The central authority may allow such access by way of subscription or fee-based service. In this manner, for instance, a central authority provider (e.g., Thomson Reuters) through a Dynamic User Profiles database may grant a service provider such as a law firm (e.g., Skadden) access to persons of interest, such as legal or other officers of potential or existing clients (e.g., John Smith, General Counsel of GEICO). In association with use of the Dynamic User Profile database, a user's current organization may allow the central authority access to internal user information, such as Outlook, contacts, etc., to allow updating of the master or authority user profile. The user profile is not necessarily simply a collection of data but may include intuitive vectoring of information to help determine and anticipate the interests of each individual user. By assigning a plurality of users to one or more groups (e.g., a profession, an industry or a department with an organization), the vectoring of interests may be combined to assume a common interest to users who are members of the group(s). Further, if the central authority of user profiles also provides professional services to the user, such as Eikon or Westlaw, then the user's activity associated with using such services may be used in updating the user profile and/or user vectoring to anticipate interests.

For example, if a user is a litigator and has researched particular issues, e.g., products liability, damages, burden of proof, or has used the service to cite-check cases and other authority included in a legal brief, e.g., Motion for Summary Judgment, then the common service provider can anticipate that the user is likely interested, at least temporally, in caselaw related to those issues and will present the user with the option of reviewing, for instance, newly issued decisions on those issues even after the research has been completed. Still further, the system may detect, such as by research activity, e.g., selection of caselaw database as federal and state for W.D.Ky, or by detecting jurisdiction included in the caption of a legal brief a particular jurisdiction or judge that is likely to be of even greater interest. The user may, upon being presented with potential items of interest, indicate by feedback whether the user desires to continue to receive such content, notices or prompts. Upon deselecting or otherwise indicating no or low interest, the central authority may downgrade (or upgrade in the opposite scenario) the level of potential interest assigned to the user. The system may automatically adjust the vectoring of user interest used with that profile based on direct user feedback or based on repeated acts of accepting or rejecting the presented potential items of interest. In this manner the ERM learns and refines based on actual user interaction. The ERM may employ a set of vectoring that includes a short-term, intermediate, and long-term sense of user interests. For example, a broad interest in the legal field and in particular in litigation will persist and follow a user over the long term whereas a narrow legal issue associated with a current lawsuit may be a short term interest that wanes over time. However, the ERM may learn over time that even narrow legal issues recur and may arise in numerous litigations throughout a career and may assign an appropriate level of interest based on this understanding of the user.

In another manner of operation, the central authority dynamic user profile provider may suggest content of potential interest or profiles of professionals or companies (e.g., potential clients or customers) to organizations or users for use in developing clientele and seeking engagements. For instance, the ERM may apply a user profile against a database of organization profiles to find companies involved in areas that match closely with the user's background. The ERM may provide contact information, if authorized by the organization, to allow the user to make contact with the organization. The central authority may be used to help users locate former employees or to otherwise maintain awareness of the positions held by and activities of former employees or clients. The ERM may be used to help identify potential employment candidates and may include a resume builder function to assist users in maintaining a current resume or biographical record. The ERM may receive an inquiry from an organization seeking a recommendation of a law firm well positioned to assist the organization in defending or bringing a lawsuit in one or more jurisdictions. The central authority may sort through the dynamic user profiles to find a firm or user/lawyer having a background, including list of litigations by subject matter and by jurisdiction, that fits the need of the organization. The approaches described herein are applicable to a broad range of fields, e.g., medical, accounting, research, sales and marketing, engineering, finance, human resources, employment, etc. Although, many examples given are in the context of the legal profession, they are examples only and the invention is not limited to this profession or area of endeavor/interest.

Figure 18:
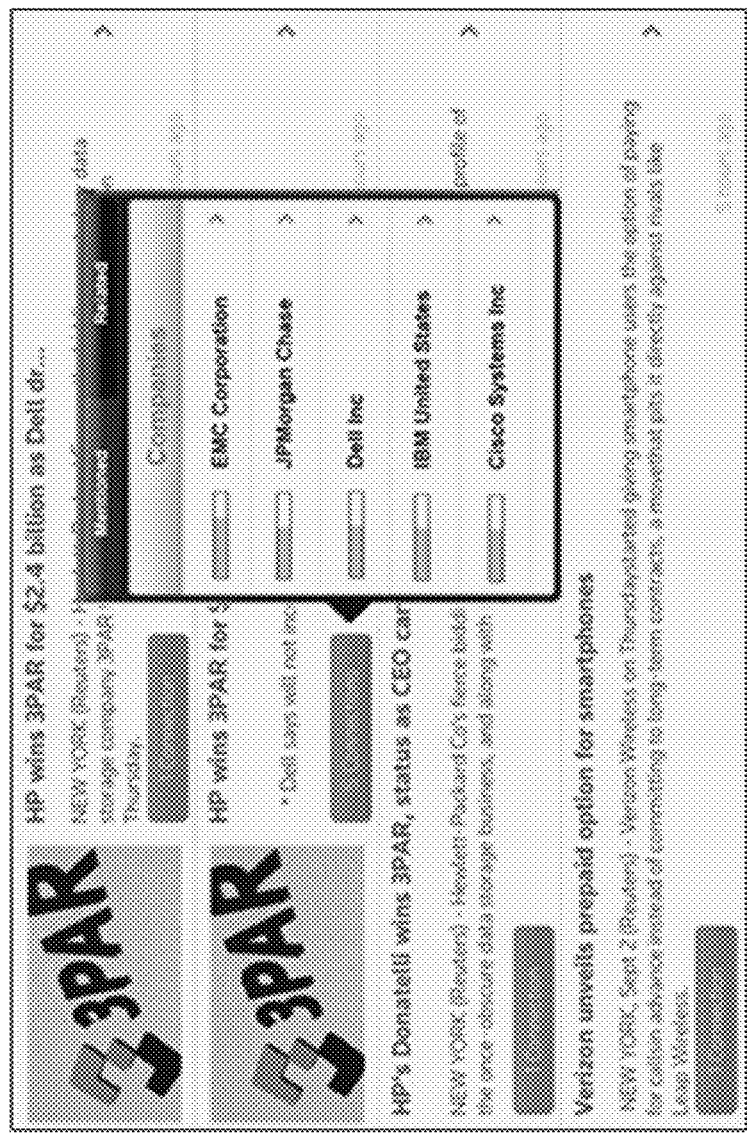
FIG. 18 is an exemplary screenshot showing popovers displaying "connections."
Figure 19:
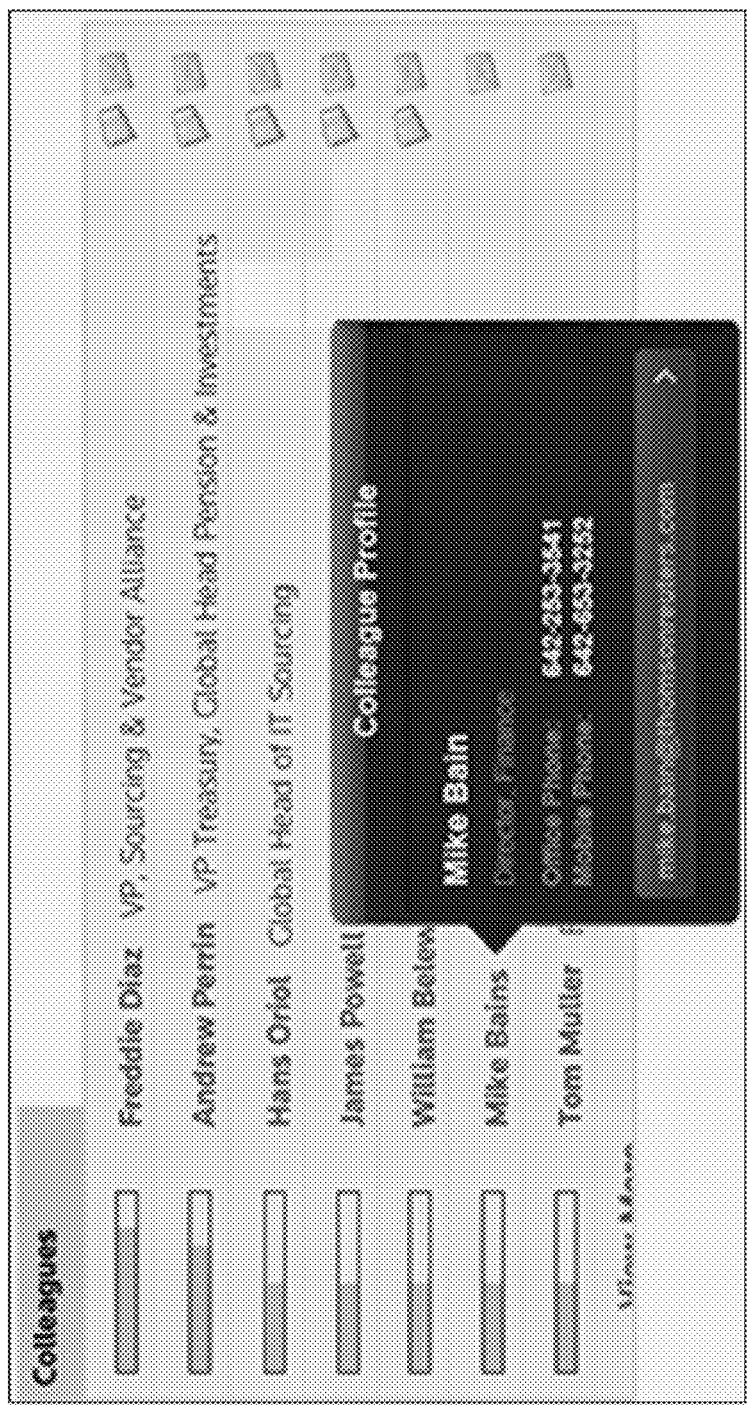
FIG. 19 is an exemplary screen shot of the UI of the ERM showing contact and colleague popovers.

As shown in FIG. 18, the panels used to display "Connections" may be popovers. E.g., see page 48 in https://developer.apple.com/library/ios/documentation/General/Conceptual/iPadHIG/iPadHIG.pdf. In one embodiment the popover allows users to toggle between "Mentioned" and "Related" companies using buttons at the top of the view, and company records are displayed with a score bar followed by the company name. Additionally, an arrow should be added on the far right of each company record to indicate that pressing the record will send the user to another screen. As shown, the popover is anchored to the connections button. The "Actions" panel presents users with a person's (contact or colleague) contact information and any corresponding actions. The Contact and Colleague popovers, see FIG. 19, display a summary section at the top with a contact's/colleague's name or email address, followed by their title (if available) and all available phone numbers. Following this summary section are links for each of the contact's/colleague's email addresses. Tapping on any of these links launches an email with the selected email address listed in the recipient field. Below these email links is a link to view the selected individual's full profile. Tapping this link takes the user to the individual's profile page. The "Actions" panel may also include actions to add a contact or a colleague as a contact on their computing device, e.g., mobile device, notebook computer, iPhone, or iPad, which, e.g., may be similar to the functionality found in the iPad Mail application. Two actions, "Create New Contact" and "Add to Existing Contact", may be included and appear grouped in a section below the email address links. These action buttons send a person's contact information over to the native device, e.g., iPad, Contacts application. In one embodiment there is no direct link between NewsApp and the Contacts application, so as contact information is updated in NewsApp, it won't float through to the Contact application.

The ERM provides useful tools, for instance article tools may be displayed at the top of a news article having a link to share the article via email. The link should launch a message dialog with the subject and body pre-populated to include the article title and full text. As a further workflow enhancement, the ERM may allow users to select Contacts or Colleagues from the UI when sharing an article or other content presented to the user. For example, when clicking on the share article link, the user might be presented with a list of all of the contacts and colleagues associated with the article. Alternatively, the user might be presented with a simple search that will allow them to locate any colleague or contact.

Figure 20:
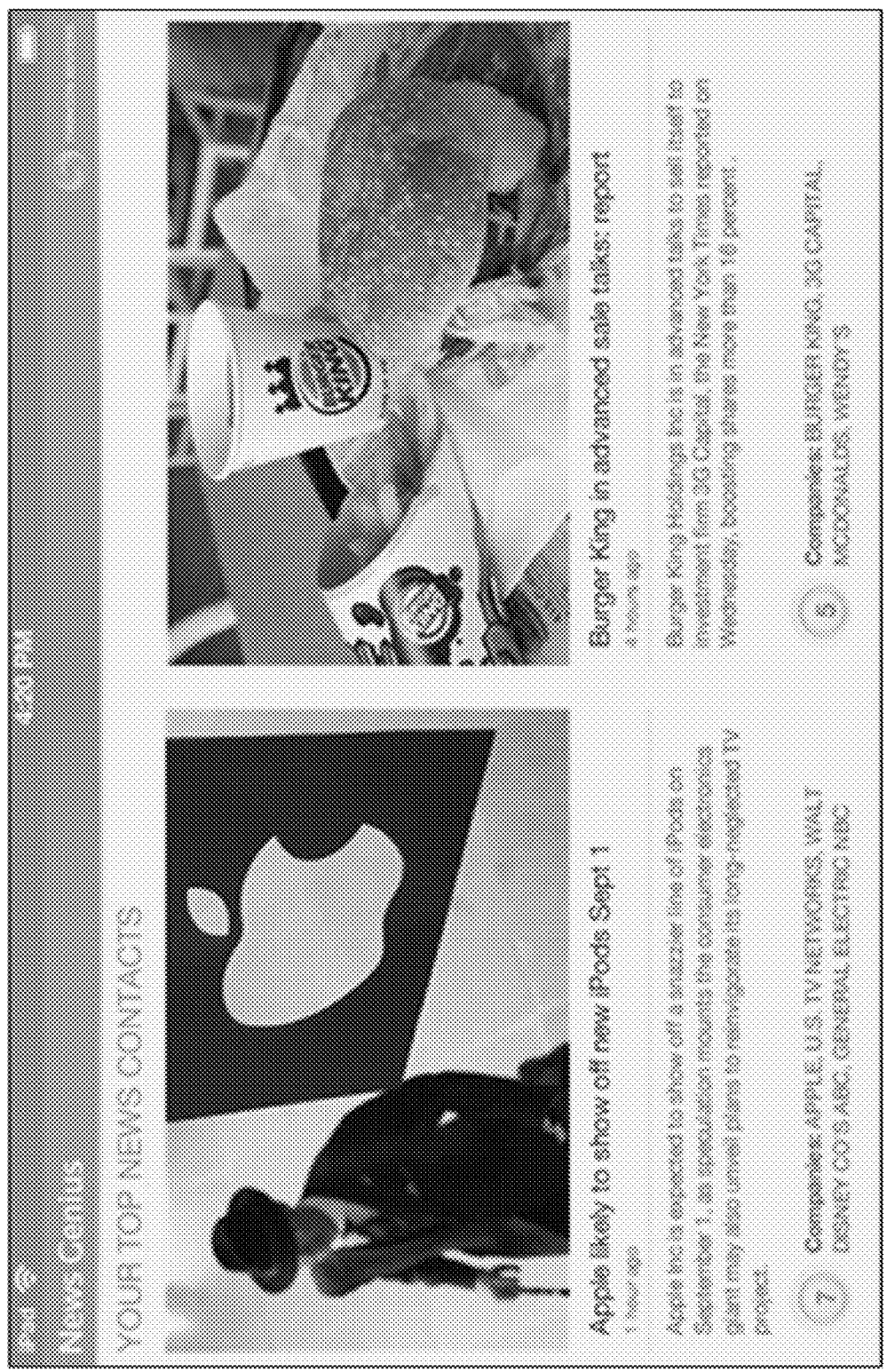
FIG. 20 is an exemplary screen shot of the UI of the ERM showing one exemplary configuration for a personalized user's "My News" page.

As used herein, the term "Connections" indicates companies mentioned in an article and may also include contacts, colleagues, relationships, companies, organizations, regulatory bodies, governmental entities, etc. FIG. 20 is a screen shot showing one exemplary configuration for a user's "My News" page. On this page a user's top news contacts is presented wherein companies (Apple, US TV Networks, Walt Disney's ABC, and General Electric NBC) are shown as occurring in the first article "Apple likely to show off new iPods Sept. 1" and companies (Burger King, 3G Capital, McDonalds, Wendy's) are shown in the other article displayed on the screen. Users will be presented with a login dialog where they can input a username and password to login to the application. The user may use their Windows credentials, which will be authenticated using the ERM Web Service. The login dialog may also give users the option of setting up the application to automatically log them in. By default, users will need to be able to connect to the ERM Web Service to authenticate.

The base URL for the ERM Web Service needs to be established before a user can log into the application. Paths may vary across client systems. If users connect to the ERM Web Service using a VPN connection, and thus accessing an internal URL, client systems may setup standard aliases for accessing the ERM Web Service. Rather than presenting users with a partial or complete list of ERM clients, the system may create a unique access code for each client. Users would then be given the access codes which could be used to lookup the appropriate URL. In one embodiment, the ERM may use the SSL VPN support in Apple iOS 4.2 to connect to ERM content. The ERM may be set up to accommodate and support other security methods and secure web services. The ERM may leverage the expanded SSL VPN support in iOS 4.2 to provide clients with the option of keeping application data behind their firm's firewall. If a secure connection isn't established, the system displays a message to the user on the Login screen letting them know that the application is in offline mode. Any relationship data stored on local devices should be encrypted to ensure that the data is protected should the device be compromised. The system may utilize the data protection APIs available in iOS 4.2 as a method for ensuring data security.

In the case of the news that the ERM pulls in that is publicly accessible, there is no need to encrypt news data stored on the device, e.g., iPad, including those stories saved to a user's "briefcase" or other such tools. Any data, e.g., relationship data, pulled back from the ERM Web Services, including connections, companies, contacts and colleagues, should be encrypted when stored in the DB. The iOS 4.2 documentation describes data encryption APIs that help with this task. The system may utilize security options in iOS 4.2, like the ability to perform a remote wipe of the device. This feature may be built into the application or may be client configurable. With respect to connectivity and accessibility, users may be provided with access to key content even when they are offline. When an Internet connection or connection to the ERM server cannot be made, the application shifts into offline mode, which will allow users to view content that has been saved to the device.

For one example, and similar to other Thomson Reuters applications (e.g. Marketboard), the ERM may provide users with a "briefcase" or other electronic tool where they can store application content. Connections should also be saved when saving a story to the briefcase, to allow users to access relationship information associated with the story. Company, colleague & contact information should be cached as it's loaded into the application. In one embodiment, the application performs data refreshes on a periodic basis, e.g., weekly. In one manner of distribution, the application may be submitted to the "App Store" and other versions may enable enterprises to securely host and wirelessly distribute their own in-house applications to employees over Wi-Fi and 3G/4G.

Figure 21:
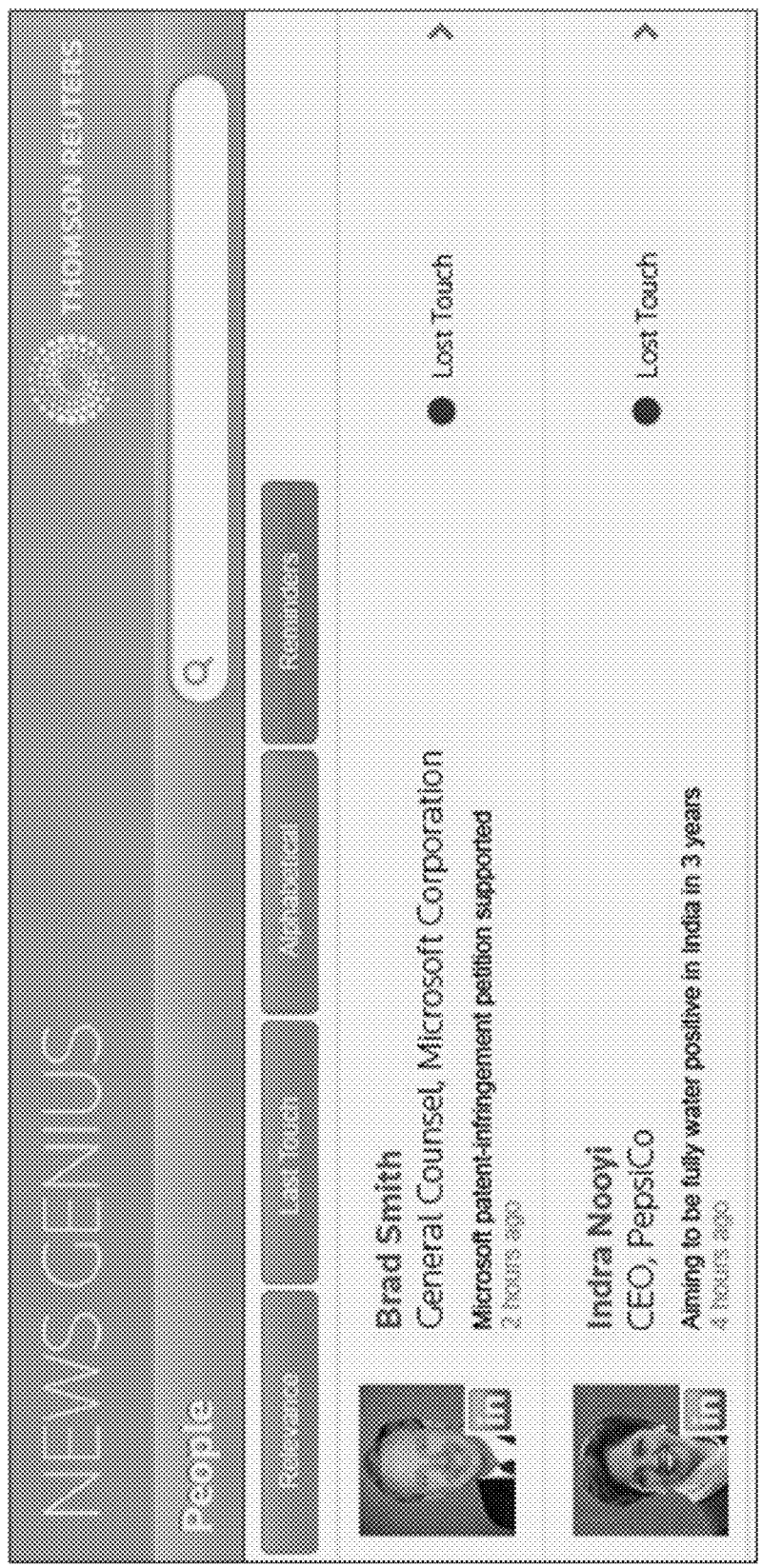
FIG. 21 is an exemplary screen shot of the UI of the ERM showing the personalized Relationship Reminders.

With reference to FIG. 21, an additional feature is Relationship Reminders, a function that gives the system the ability to view additional metadata about a contact's reminder status and the ability to sort by that metadata on the People Home Page. An added feature is support for user calendar data. Functionality would include event streams displayed on Company and Contact profiles, a dashboard widget for Upcoming Meetings, and new sort options for the Contact and Company Home Pages to order content by date of next meeting.

In one embodiment the ERM hooks into an outside API, e.g., the Spotlight API, that returns basic financial information, including a stock graph, for a company and leverages that information to enhance company profiles. The ERM may be adapted to access other systems, e.g., social networks such as Facebook and LinkedIn, to request access to a custom API (http://developerlinkedin.com/thread/1131). Alternatively, the system may make use of a public service like RapLeaf (http://www.rapleaf.com/apidoc/person).

The ERM provides professional services firms tools to gather and analyze their relationship data allowing them access to this data through powerful enterprise relationship search and analytics functionality. Each client determines the appropriate data sources for analysis, which can include: E-mail, address book and calendaring applications (Outlook, Notes, etc.); CRM Systems (InterAction, MSCRM, etc.); Marketing Databases; HR Databases; Billing Systems; Phone Systems (VOIP systems). The ERM leverages relationship intelligence with service provider resources, e.g., Thomson Reuters, including news content, professional databases, and search capabilities. In this manner the ERM delivers a targeted view of the news focused on the companies and persons that matter most to a user. Stories are linked directly to company profiles that pull in the ERM's relationship data to allow for easy follow up. Users can view information about their contacts at the company (even if those contacts don't exist in their mobile device or desktop email client) and colleagues at their firm with relationships to the company. The NewsModule provides both a filtered and unfiltered view of the latest news and media available from one or more resources, e.g., Thomson Reuters. In one example, this news is delivered through an API, e.g., the Reuters Spotlight API. News stories are linked to company profiles whenever a relevant company is identified. These company profiles contain relationship information (company contacts known by the user and firm colleagues who know the company) and a news summary specific to the company being viewed. These profiles can also be launched from the Company home page, which lists all of the companies known by the user.

The relationship data available in company profiles links out to people profiles for each contact. These people profiles display contact information, relationship information (firm colleagues who know the contact) and a news summary for that person. Like the company profiles, these people profiles can be launched from a People home page, which lists all of the contacts known by the user.

In one embodiment, the ERM provides an API designed to provide read-only access to ERM searches and data, and it enables a variety of integration scenarios. Four basic components to the ERM API are: configuration—the set of options configured in the ERM API that determine how the ERM can be accessed by the user; objects—examples of objects: Company, Contact, Relationship; resource addresses—The scheme of addresses at which objects can be found. Example: /company/121; and response formats—The format in which those objects are returned by the service. Examples: XML, JSON, JSONP. For example, the Spotlight service provides access to Thomson Reuters content through standards based XML APIs feeds. The ERM may use background requests to gather data. In some cases, the data being returned by certain web calls is sufficiently static that the call doesn't need to be fired each time the data is accessed by the application. Instead, data can be retrieved and cached.

Figure 22:
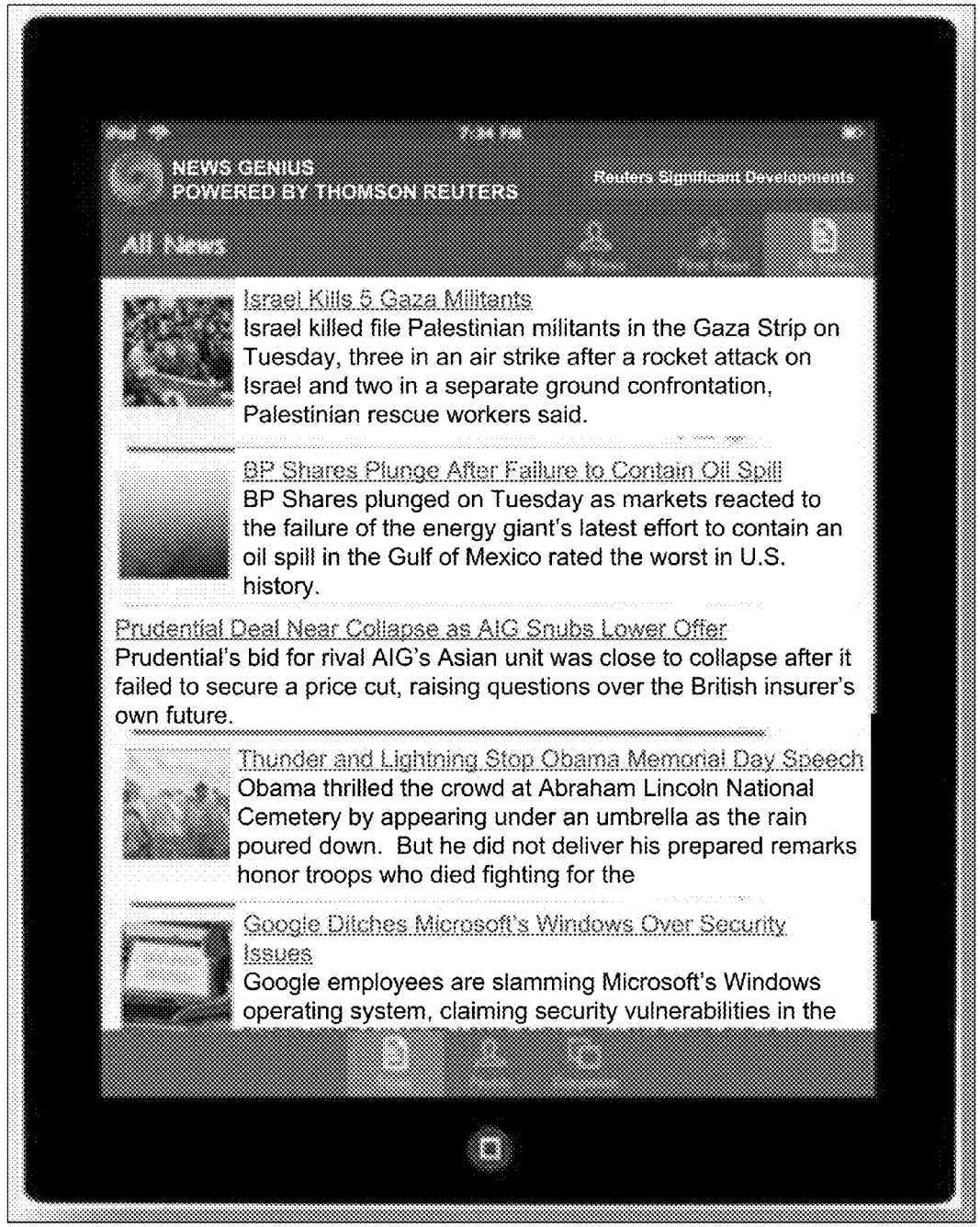
FIG. 22 is an exemplary screen shot of the UI of the ERM showing an iPad environment page with a simple, unfiltered view of the news sources that are pulled in by ERM.
Figure 23:
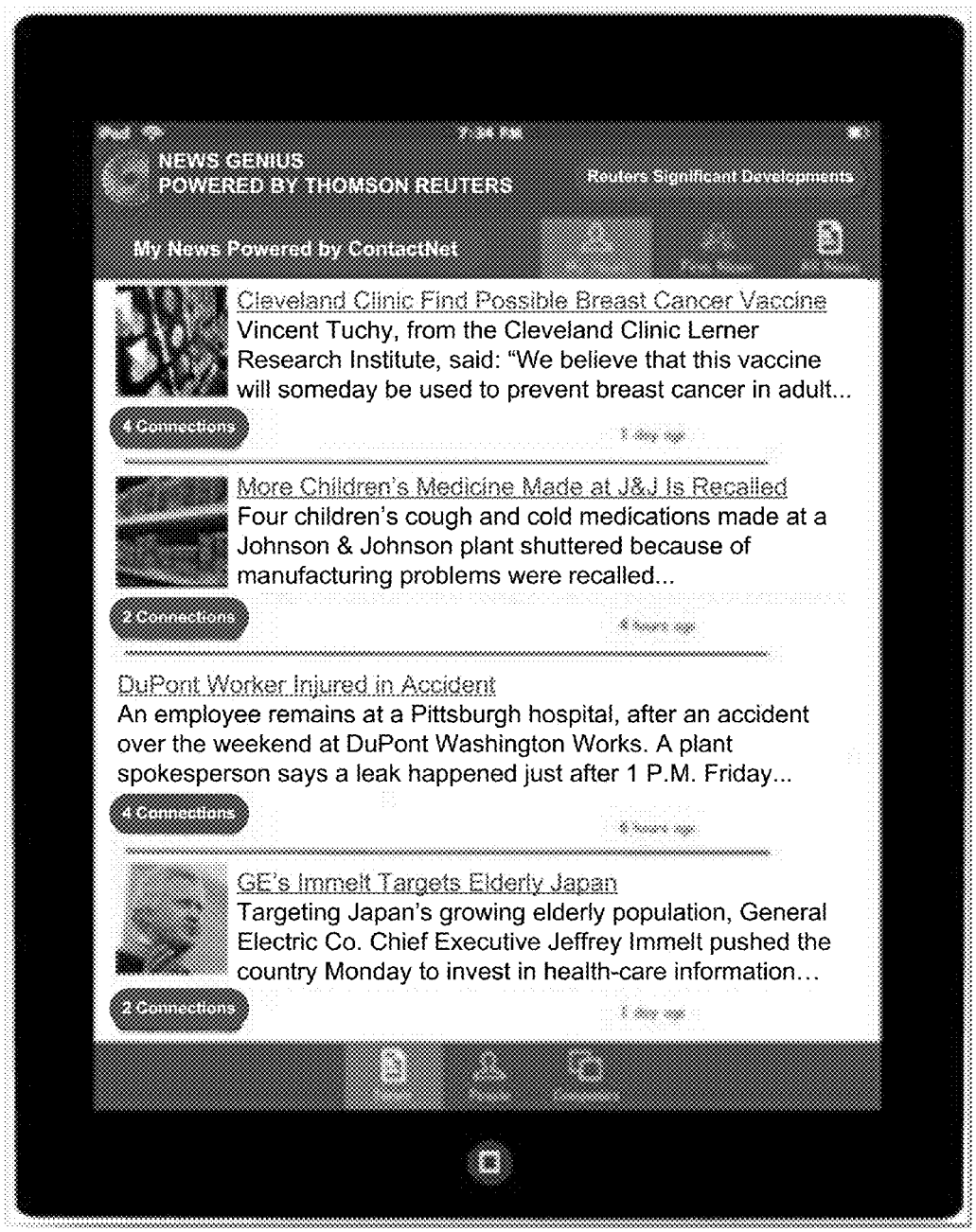
FIG. 23 is an exemplary screen shot of the UI of the ERM showing a filtered view of the news sources that were pulled in by ERM that is limited to news items related to companies identified as having a relationship with a user account.

With reference to FIG. 22, this exemplary screen shot of an iPad page provides a simple, unfiltered view of the news sources that are pulled into NewsGenius. Content should be aggregated from the Spotlight API and delivered back to the user in a chronologically ordered view with the most recent information appearing at the top. By default, the view should show the top 10 stories returned from our API requests. Tapping the "View More" should append the view with the next 10 news items. The exact query used to gather this information can be obtained from the TR News Pro code. The query should be the same one used to populate the "Top News" section on the "News" tab. With reference to FIG. 23, this exemplary page provides a filtered view of the news sources that were pulled into NewsGenius that is limited to news items related to companies identified as having a relationship with the user. This view is constructed by taking a list of known companies returned through ERM and using the company IDs provided to query the different news data sources: Spotlight API, Twitter API and LinkedIn APIs.

Based on the relationship data it captures, the ERM is able to determine the set of companies that a given user has the strongest relationships with. A static data set can be used. It may be assumed that the ERM response will contain an array of companies with each company object being returned as follows. The sample response given is in JSON, but responses can also be delivered in XML:

```
{
    "CNID":23
    "Contacts":null
    "HasRelationships":true
    "Identifiers":["23", "BS213"]
    "IsDeleted":false
    "IsClient":true
    "ScoreValue":33.534731577696135
    "Name":"Microsoft Corporation"
    "Relationship":null
}
```

Each company record in the ERM response obtained contains an "Identifiers" array that lists all of the IDs associated with that company. These identifiers can be used to query the Spotlight API to pull news items. In cases where an appropriate company ID is not provided, alternate Spotlight API requests may be made using company name as a search string. If the ERM response included three companies: Vodafone, IBM and Microsoft, with the corresponding Instrument Classification IDs listed in the responses "Identifiers" array: "RIvod.l", "RIibm.n" and "RImsft.o", then, for example, a Spotlight request might look like this:

http://apiservice.reuters.com/api/service/
batch?edition=US&companynews=vod.l,ibm.n,
msft.o&format=json&protocolVersion=
1.4&apikey=7BDE11E6AED4673AAF9154143-
4A658A2&device=iPad%20Simulator&deviceid=
3D434A86-CF9A-52C4-9BD9-
08783D7DC454&screenWidth=768&screenHeight=
1024&app=TR. News Pro-iPad&appName=
News%20Pro&version=1.1.5&build=2010052102

For companies in the ERM response without an appropriate ID, {Name} may be used to query the news source. Either type of request (name-based or ID-based) will return an array of news items similar to the following:

```
{
"title": "Analysis: Yahoo's Asia assets in investor spotlight",
    "link":
"http://www.reuters.com/article/companyNews/idUSTRE66Q6OQ20100727?symbol=MSFT.O",
    "guid": "USTRE66Q6OQ20100727",
    "category": "MSFT.O",
    "published": "2010-07-27T21:57:33Z",
    "updated": "",
    "description": "SAN FRANCISCO (Reuters) - Yahoo Inc's
plans for its Asian assets are in the investor spotlight,
following the surprise news that Yahoo Japan has turned to
Google Inc   for its Internet search technology.",
    "keywords": [
        "General News"
        ...Continued
        ],
    "tickers":[
        "ch;GOOG"
        ...Continued
        ],
    "body": {
        "type": "html",
        "lang": "en",
        "text": "<p>By Alexei Oreskovic</p>\n\n<p>SAN
FRANCISCO (Reuters) - Yahoo Inc's (YHOO.O: <ahref
=\"/stocks/quote?symbol=YHOO.O\">Quote</a>
        ...Continued
    },
    "sources": [
        ]
}
```

Once news is collected, it is aggregated and delivered back to the user ordered by date (time is discarded in this ordering) and company importance as determined by relationship score. Because the data may be coming back through multiple requests, this page will need a way to merge multiple response sets. Reconciling duplicate records across response sets may be performed, including merging the various response sets and applying sorting criteria across the resultant superset of data. A "Connections" button sits beneath each headline. This button indicates the number of matches pulled out from the article in the queries. For both ID and name-based queries, this number can be gathered by parsing the text element of the returned news item. Clicking on the Connections button should display a dialog containing summary info about the companies that are either mentioned directly in the story or that are in the same industry group as one of the mentioned companies. The summary information includes relationship strength, the company name, and whether or not the company is a client. This information is returned in the ERM response as ScoreValue, Name and IsClient respectively.

Companies in the Connections panel are sorted by relationship strength in descending order. A "Mentioned" tab lists all of the companies that were directly matched to the news item in question and a "Related" tab lists all of the companies that are related to a "mentioned" company through a shared industry code. Obtaining the list may involve running a separate lookup based on the industry codes returned for the "mentioned" companies. This page will use the ERM requests to return the list of companies (order by ScoreValue) that the ERM determines the target user "knows." The ERM response contains an array of companies with each company object being returned as follows. The sample response given is in JSON, but responses can also be delivered in XML:

```
{
    "CNID":23
    "Contacts":null
    "HasRelationships":true
    "Identifiers":["23", "BS213"]
    "IsDeleted":false
    "IsClient":true
    "ScoreValue":33.534731577696135
    "Name":"Microsoft Corporation"
    "Relationships":null
}
```

Figure 24:
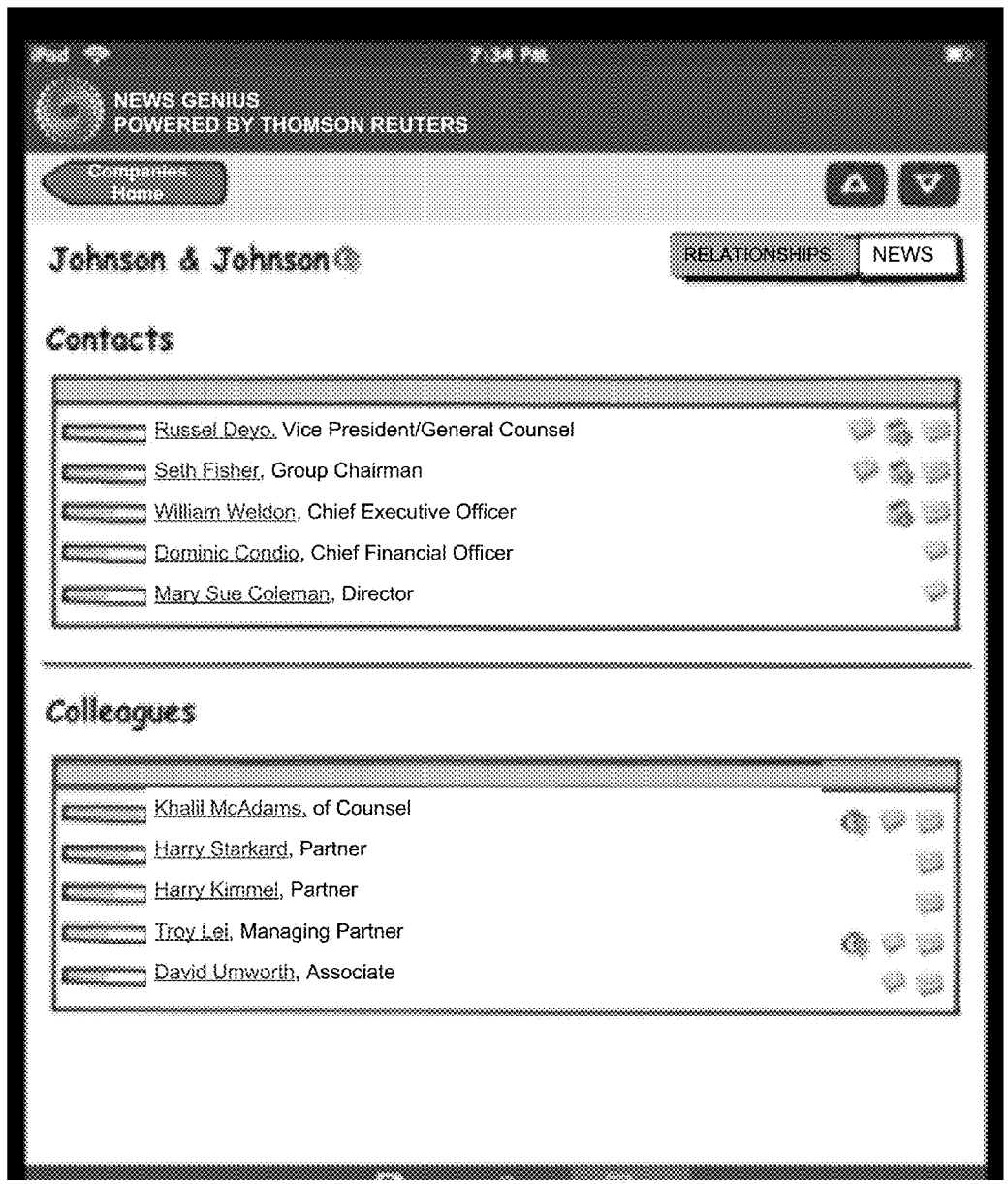
FIG. 24 is an exemplary screen shot of the UI of the ERM showing the company relationships page which has two main elements: the "Contacts" panel and the "Colleagues" panel.

Company records contain relationship strength, company name, and whether or not the company is a client. This information is returned in the ERM response as ScoreValue, Name and IsClient respectively. With reference to FIG. 24, the company relationships page has two main elements: the "Contacts" panel and the "Colleagues" panel. Information for these two panels is obtained using ERM calls. The page title can be constructed from either the contact or colleague responses, or from information passed in through the company link on the Company Home Page or Connections Panel. Along with the company name, the page title should include an indication of whether or not the company is a client. The "Contacts" panel displays the user's contacts at the company in question. This is obtained using the following ERM call: /companies/{Company ID}/relationships?includeContactRelationships=true, that returns a response like:

```
{
   "Colleague":{
      "CNID":1203535,
      "Department":"5100 West Goldleaf Circle, Suite 100",
      "EmailAddresses":[
         "david.djujich@thomsonreuters.com",
         "david.djujich@thomson.com",
         "ddjujich@mailhost.elite.com",
         "ddjujich@mailhost5.elite.com",
         "ddjujich@elite.com"
      ],
      "FirstName":"David",
      "LastName":"Djujich",
      "Relationships":[
         {
            "Colleague":{
               "CNID":1203535,
               "Department":"5100 West Goldleaf Circle, Suite 100",
               "EmailAddresses":[
                  "david.djujich@thomsonreuters.com",
                  "david.djujich@thomson.com",
                  "ddjujich@mailhost.elite.com",
                  "ddjujich@mailhost5.elite.com",
                  "ddjujich@elite.com"
               ],
               "FirstName":"David",
               "LastName":"Djujich",
               "Relationships":null,
               "Title":"Regional Sales Manager"
            },
            "Company":null,
            "Contact":{
               "CNID":1770510,
               "Company":{
                  "CNID":100580,
                  "Contacts":null,
                  "HasRelationship":true,
                  "Identifiers":[
                     "100580"
                  ],
                  "IsClient":false,
                  "IsDeleted":false,
                  "Name":"Bonne, Bridges, Mueller, O'Keefe & Nichols PC",
                  "Relationships":null
               },
               "EmailAddresses":[
                  "bblakely@bonnebridges.com"
               ],
               "FirstName":null,
               "LastName":null,
               "Relationships":null,
               "Score":null,
               "Title":null
            },
            "Industry":null,
            "ScoreValue":"68-90253086419753,
            "Type":"toContact"
         }
```

To get the list of contacts belonging to the active user, the ERM first locates the top-level "Colleague" element corresponding to the active user (CNID can be provided for the logged in user). This element can then be parsed to separate out the "Contact" elements from the associated "Relationships" elements. A separate element will be presented in the ERM response for each type of phone number (Work, Cell, Home). Selecting one of the phone numbers should start a call on the user's mobile device. If no phone numbers exist for the contact, the phone icon shouldn't display. The "Colleagues" panel displays colleagues at the user's firm that have a relationship to the company in question. This information is obtained using the following ERM call: /companies/{Company ID}/relationships?includeContactRelationships=false, that call will return a response like:

```
{
   "Colleague":{
      "CNID":1203535,
      "Department":"5100 West Goldleaf Circle, Suite 100",
      "EmailAddresses":[
         "david.djujich@thomsonreuters.com",
         "david.djujich@thomson.com",
         "ddjujich@mailhost.elite.com",
         "ddjujich@mailhost5.elite.com",
         "ddjujich@elite.com"
      ],
      "FirstName":"David",
      "LastName":"Djujich",
      "Relationships":null,
      "Title":"Regional Sales Manager"
   },
   "Company":{
      "CNID":100580,
      "Contacts":null,
      "HasRelationship":true,
      "Identifiers":[
         "100580"
      ],
      "IsClient":false,
      "IsDeleted":false,
      "Name":"Bonne, Bridges, Mueller, O'Keefe & Nichols PC",
      "Relationships":null
   },
   "Contact":null,
   "Industry":null,
   "ScoreValue":129.33513888888888,
   "Type":"toCompany"
},
```

Additionally, users will be able to search across their entire set of known contacts using the search bar in the upper right-hand corner of the screen. The list of known contacts for a given user can be retrieved through ERM using the following call: /colleagues/{Colleague ID}/relationships, that request will return an array of "Relationships" like the one below:

```
{
   "Colleague":{
      "CNID":1203535,
      "Department":"5100 West Goldleaf Circle, Suite 100",
      "EmailAddresses":[
         "david.djujich@thomsonreuters.com",
         "david.djujich@thomson.com",
         "ddjujich@mailhost.elite.com",
         "ddjujich@mailhost5.elite.com",
         "ddjujich@elite.com"
      ],
      "FirstName":"David",
      "LastName":"Djujich",
      "Relationships":null,
      "Title":"Regional Sales Manager"
   },
   "Company":null,
   "Contact":{
      "CNID":1702719,
      "Company":{
         "CNID":221325,
         "Contacts":null,
         "HasRelationship":true,
         "Identifiers":[
            "221325"
```

```
    ],
    "IsClient":false,
    "IsDeleted":false,
    "Name":"eBillingHub",
    "Relationships":null
  },
  "EmailAddresses":[
    "ryan@ebillinghub.com",
    "ryan.ladisic@ebillinghub.com"
  ],
  "FirstName":"Ryan",
  "LastName":"Ladisic",
  "Relationships":null,
  "Score":null,
  "Title":null
},
"Industry":null,
"ScoreValue":129.91434513177183,
"Type":"toContact"
},
```

Figure 25:
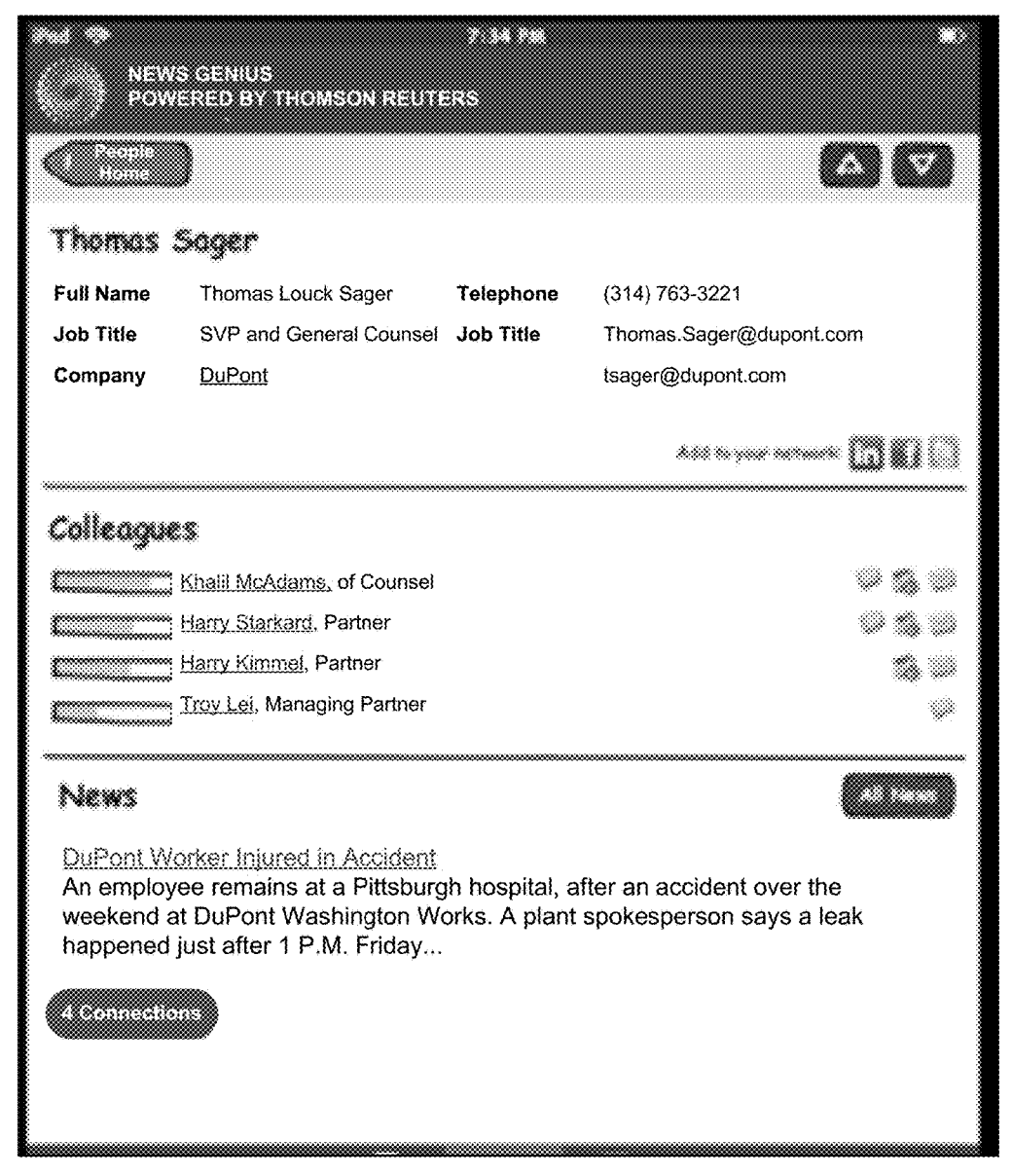

The "Relationships" array can be parsed to pull out the individual "Contact" records. The resulting records that are displayed in the UI should contain relationship strength, contact name or primary email address, contact title and contact company. With reference to FIG. 25, the people profile pages contain three main elements: the contact and relationship information sections, both of which rely solely on calls to ERM, and the News section, which uses data from the ERM calls to request data through the Spotlight API. Contact information is pulled in using the following ERM request: /contacts/{Contact ID}, this request will return a contact record similar to the following:

```
{
  "CNID":1770510,
  "Company":{
    "CNID":100580,
    "Contacts":null,
    "HasRelationship":true,
    "Identifiers":[
      "100580"
    ],
    "IsClient":false,
    "IsDeleted":false,
    "Name":"Bonne, Bridges, Mueller, O'Keefe & Nichols PC",
    "Relationships":null
  },
  "EmailAddresses":[
    "bblakely@bonnebridges.com"
  ],
  "FirstName":null,
  "LastName":null,
  "Relationships":null,
  "Score":68.90253086419753,
  "Title":null
}
```

The "Colleagues" panel displays the colleagues at the target user's firm with relationships to the contact in question. This information can be pulled back from ERM by appending the query in section 4.2.1 as follows: /contacts/{Contact ID}/relationships. The changed query will now return an array of "Relationship" objects, each of which contains a "Colleague" and a "Contact" record. The individual "Colleague" elements can be extracted from this array to give a complete list of colleagues with relationships to the target contact. A sample ERM response is below:

```
{
  "Colleague":{
    "CNID":1203535,
    "Department":"5100 West Goldleaf Circle, Suite 100",
    "EmailAddresses":[
      "david.djujich@thomsonreuters.com",
      "david.djujich@thomson.com",
      "ddjujich@mailhost.elite.com",
      "ddjujich@mailhost5.elite.com",
      "ddjujich@elite.com"
    ],
    "FirstName":"David",
    "LastName":"Djujich",
    "Relationships":null,
    "Title":"Regional Sales Manager"
  },
  "Company":null,
  "Contact":{
    "CNID":1770510,
    "Company":{
      "CNID":100580,
      "Contacts":null,
      "HasRelationship":true,
      "Identifiers":[
        "100580"
      ],
      "IsClient":false,
      "IsDeleted":false,
      "Name":"Bonne, Bridges, Mueller, O'Keefe & Nichols PC",
      "Relationships":null
    },
    "EmailAddresses":[
      "bblakely@bonnebridges.com"
    ],
    "FirstName":null,
    "LastName":null,
    "Relationships":null,
    "Score":null,
    "Title":null
  },
  "Industry":null,
  "ScoreValue":68.90253086419753,
  "Type":"toContact"
}
```

Note that the text in the table above corresponds to the following fields from the JSON response received from ERM: {ScoreValue}, {FirstName LastName}, {Title} {Source Icons}. The final element of the People profile page is the News panel. This section pulls in contact-relevant news from the Spotlight API.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-implemented method of maintaining a database of user profiles based, respectively, on user interaction with third-party systems, the method comprising:

maintaining by a first system a first database comprising user profile records;

accessing from the first database a unique user profile associated with a unique user, the unique user profile comprising personal information related to the unique user and information representing at least one entity of interest to the unique user;

automatically collecting, by an agent module executing on a processor associated with the first system, data associated with the unique user based at least in part on the unique user's interaction with a system unassociated with the first system;

evaluating by the processor the collected data and searching available databases other than the first database to identify potential items of interest to the unique user based at least in part on the unique user profile and the collected data, at least one identified potential item of interest from the identified potential items of interest related to an entity of interest to the unique user;

determining a set of predicted items of interest to the unique user from the identified potential items of interest; and presenting at a display associated with the unique user data representing the set of predicted items of interest and the identified potential items of interest, the data representing the set of predicted items of interest provided as one or more user interface elements associated with corresponding identified potential items of interest.

2. The method of claim 1, wherein automatically collecting by an agent module data associated with the unique user includes accessing and searching user account data associated with the unique user.

3. The method of claim 2, wherein the user account data includes one or more of: email; calendar; contacts; phone record accounts; an entry in a calendar program indicating a scheduled meeting with a first entity; a contact record representing the first entity; an email including an email address associated with the first entity; and an email containing a name or other identifier associated with the first entity; a billing system entry containing client, billing, time or related data; a customer relationship management (CRM) system entry containing contact, company, activity or related data; a phone call record; a travel system entry containing travel plans, reservations and related data; click stream data; and application usage data.

4. The method of claim 3, wherein the set of predicted items of interest to the unique user includes content concerning a first entity, the content being one or more of biography, article, caselaw, website, regulatory filing, financial reporting, transcripts, interviews, competitive intelligence, trading data, related analytics, third-party reports, and related internal data, such as CRM activities, experience data and related proposals.

5. The method of claim 1, wherein the evaluating collected data and searching available databases includes accessing one or more of: publicly available content database; subscriber-based content database; fee-based content database; professional service provider content database; government maintained database; and regulatory database.

6. The method of claim 5, wherein evaluating collected data and searching available databases includes using secure sign-in data associated with the unique user to automatically access a database via a secure sign-in procedure.

7. The method of claim 6, wherein the secure sign-in data includes user login identifier and password data associated with the unique user.

8. The method of claim 5, wherein evaluating collected data and searching available databases includes using user profiles associated with one or more of professional networking sites (e.g., LinkedIn) and social networking sites (e.g., Facebook, MySpace) to collect either professional data, personal data, or both professional and personal data, associated with the user or an entity linked to the user.

9. The method of claim 8 further comprising accessing one or more user profiles associated with one or more of professional and social networking sites to collect either professional data, personal data, or both professional and personal data, associated with the user associated with the one or more user profiles.

10. The method of claim 1 further comprising:
determining based at least in part on the collected data a first entity, the set of predicted items of interest being related to the first entity.

11. The method of claim 10, wherein determining based at least in part on the collected data includes one or more from the group consisting of: evaluating the strength of relationship between the first entity and the unique user; comparing the first entity with an authority database to validate the identity of the first entity; comparing the first entity with one or more databases to determine a confidence level used to associate the first entity with a known entity; performing a disambiguation process on the first entity to validate the identity of the first entity; and performing a data cleansing to eliminate false positive identification of entities.

12. The method of claim 1, wherein determining a set of predicted items of interest to the unique user from the identified potential items of interest includes performing one or more of Bayesian, idf, and TF-idf, processes on the identified potential items of interest.

13. The method of claim 1, wherein presenting the unique user with data representing the set of predicted items of interest includes presenting links to one or more of document, webpage, contact data, profile data, email data, calendar data, and database; automatically generating and transmitting an email to an email account associated with the unique user; and automatically generating and presenting via a user dashboard associated with the unique user links to one or more of the predicted items of interest.

14. The method of claim 1 further comprising presenting the unique user with a user interface comprising a set of functions enabling the unique user to either dynamically select, dynamically deselect, or both dynamically select and dynamically deselect, certain ones of the predicted items of interest.

15. The method of claim 1 further comprising the unique user taking an action related to the predicted items of interest and collecting data associated with the user action and updating the user profile based on the collected data associated with the user action.

16. The method of claim 1 further comprising building a user profile via algorithms to segment and rank the areas of interest to a given user.

17. The method of claim 16 further comprising modifying the user profile based on user's reactions to the presented data.

18. A non-transitory computer-readable medium comprising code adapted to maintain a database of user profiles based, respectively, on user interaction with third-party systems, the code being executable by a server comprising a processor and a memory adapted to store executable program instructions and being in communication with an associated database comprising a plurality of user profiles, each user profile being unique and being associated with a unique user entity, at least one unique user profile comprising personal information related to a unique user and information representing at least one entity of interest to the unique user, the server adapted to access the database and to receive inputs, the computer-readable medium comprising:
- an agent module comprising a first set of code executable by the processor and adapted to process data associated with the unique user based at least in part on the unique user's interaction with an unassociated system;
- a second set of executable code adapted to evaluate collected data and search available databases to identify potential items of interest to the unique user based at least in part on the unique user profile and the collected data, at least one identified potential item of interest from the identified potential items of interest related to an entity of interest to the unique user;
- a third set of executable code adapted to determine a set of predicted items of interest to the unique user from the identified potential items of interest; and
- a fourth set of executable code adapted to present at a display associated with the unique user data representing the set of predicted items of interest and the identified potential items of interest, the data representing the set of predicted items of interest provided as one or more user interface elements associated with corresponding identified potential items of interest.

* * * * *